(12) United States Patent
Tanaka et al.

(10) Patent No.: US 7,899,814 B2
(45) Date of Patent: Mar. 1, 2011

(54) CONTENTS INFORMATION SEARCH CONTROL SYSTEM AND CONTENTS INFORMATION SEARCH CONTROL METHOD

(75) Inventors: Tomohiko Tanaka, Tokyo (JP); Aya Suzuki, Tokyo (JP); Jun Takemura, Tokyo (JP); Masahiro Hora, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 463 days.

(21) Appl. No.: 12/056,886

(22) Filed: Mar. 27, 2008

(65) Prior Publication Data

US 2008/0243794 A1 Oct. 2, 2008

(30) Foreign Application Priority Data

Mar. 30, 2007 (JP) .................... 2007-095086

(51) Int. Cl.
  *G06F 17/00* (2006.01)
  *G06F 3/01* (2006.01)
(52) U.S. Cl. ........................ 707/724; 715/745
(58) Field of Classification Search .............. 707/722, 707/724, 732, 733, 735, 751, 758; 715/745
See application file for complete search history.

(56) References Cited

U.S. PATENT DOCUMENTS

| | | | |
|---|---|---|---|
| 7,228,507 B2* | 6/2007 | Good et al. | 715/778 |
| 7,707,209 B2* | 4/2010 | Tanaka | 707/724 |
| 2003/0191685 A1* | 10/2003 | Reese | 705/14 |

FOREIGN PATENT DOCUMENTS

| | | |
|---|---|---|
| EP | 1837777 | 9/2007 |
| JP | 2002-108923 | 4/2002 |
| WO | 2006/057356 | 6/2006 |

OTHER PUBLICATIONS

English language Abstract of JP 2002-108923.
U.S. Appl. No. 11/720,138 to Tanaka, which was filed on May 24, 2007.

* cited by examiner

*Primary Examiner* — Hung T Vy
(74) *Attorney, Agent, or Firm* — Greenblum & Bernstein P.L.C.

(57) ABSTRACT

Disclosed is a contents information search control system that, when automatic search of contents, such as game software, is performed with a terminal, such as a cellular phone, according to a user's preference, can reflect a change in user's interest or expansion of a target range of an interest. A change in user's interest is quantitatively grasped as an interest vector, and when the interest vector satisfies a predetermined condition, a search condition is updated to reflect the change in the user's interest in a search condition. In addition, expansion of a target range of the user's interest is quantitatively grasped as distance information, and when the distance information satisfies a predetermined condition, the search condition is updated to reflect the expansion of the target range of the user's interest in the search condition. The interest vector or the distance information is calculated from an automatic search result on the basis of contents selected by a user, and updated as occasion demands.

11 Claims, 20 Drawing Sheets

FIG. 13

USER TERMINAL (X)

USER POSITION (2, 2)

INTEREST VECTOR (3, 3)

DISTANCE INFORMATION 2

PRECISION 100

ACTIVATION FREQUENCY 50

CONTENTS SERVER

| USER | USER POSITION | SEARCH CONDITION |
|------|---------------|------------------|
| X | 2, 2 | DISTANCE FROM USER POSITION IS 2 TO 3 |
| Y | 3, 3 | SUM OF USER POSITION AND DISTANCE FROM (4, 4) IS 3 OR LESS |
| .. | .. | |

USER INFORMATION

| GAME | POSITION |
|------|----------|
| G1 | 4, 2 |
| G2 | 5, 4 |
| G3 | 2, 3 |
| ... | ... |

GAME INFORMATION

SEARCH CONDITION CHANGE RULE

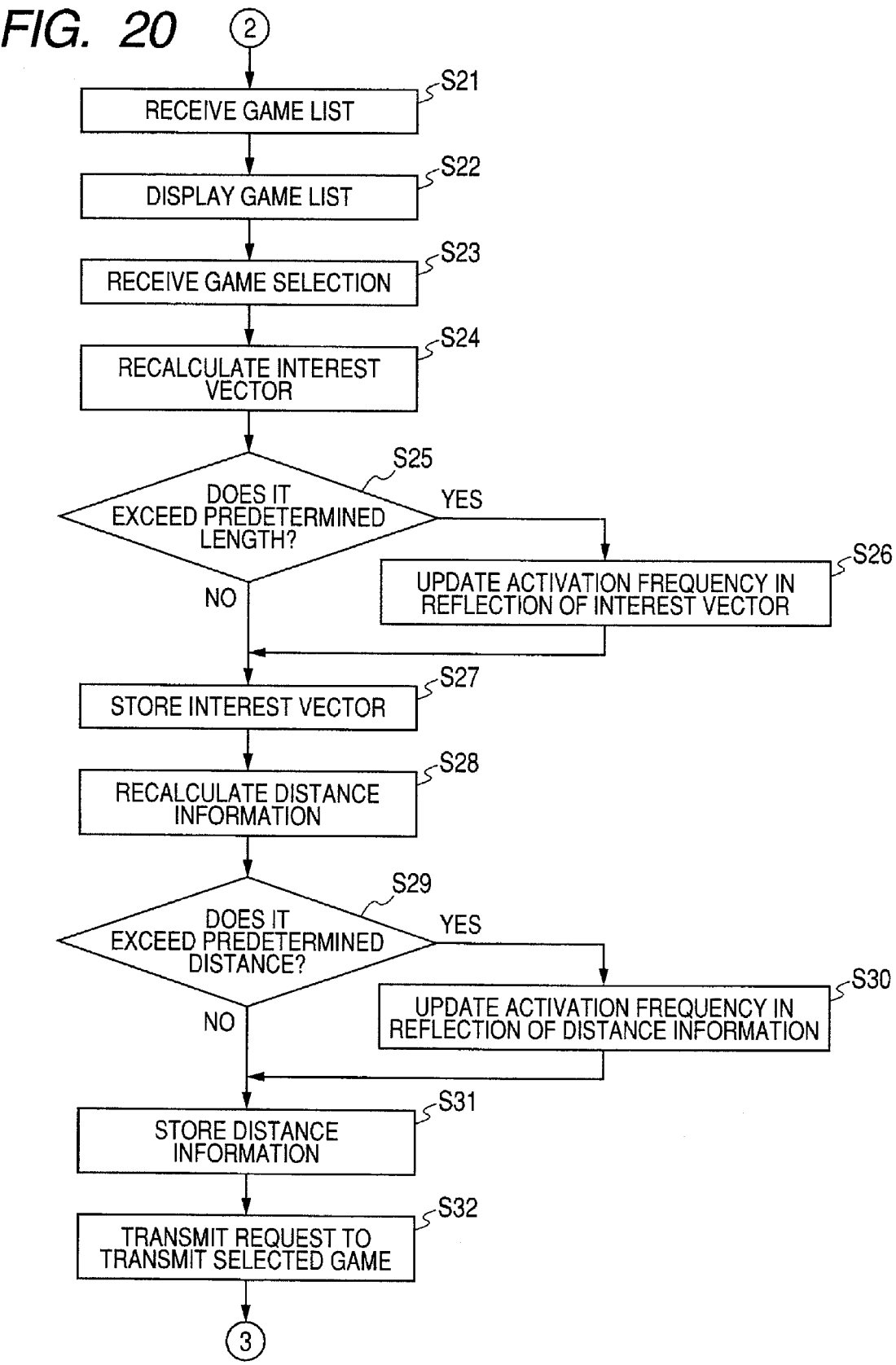

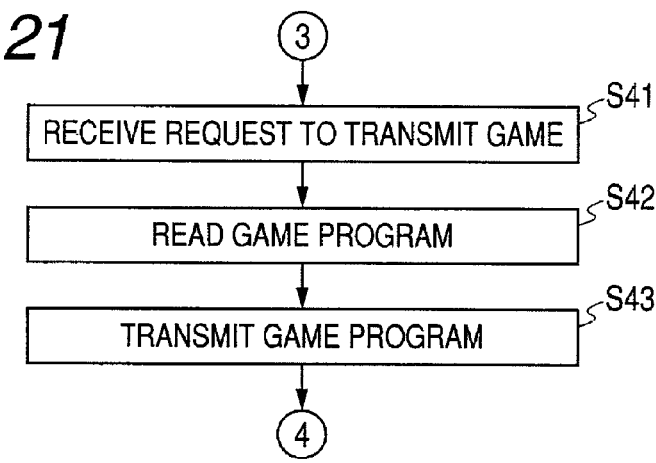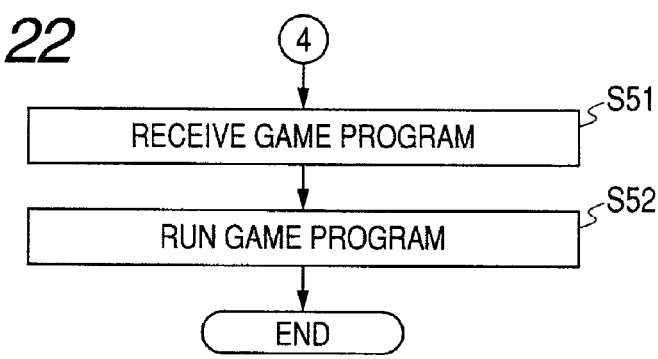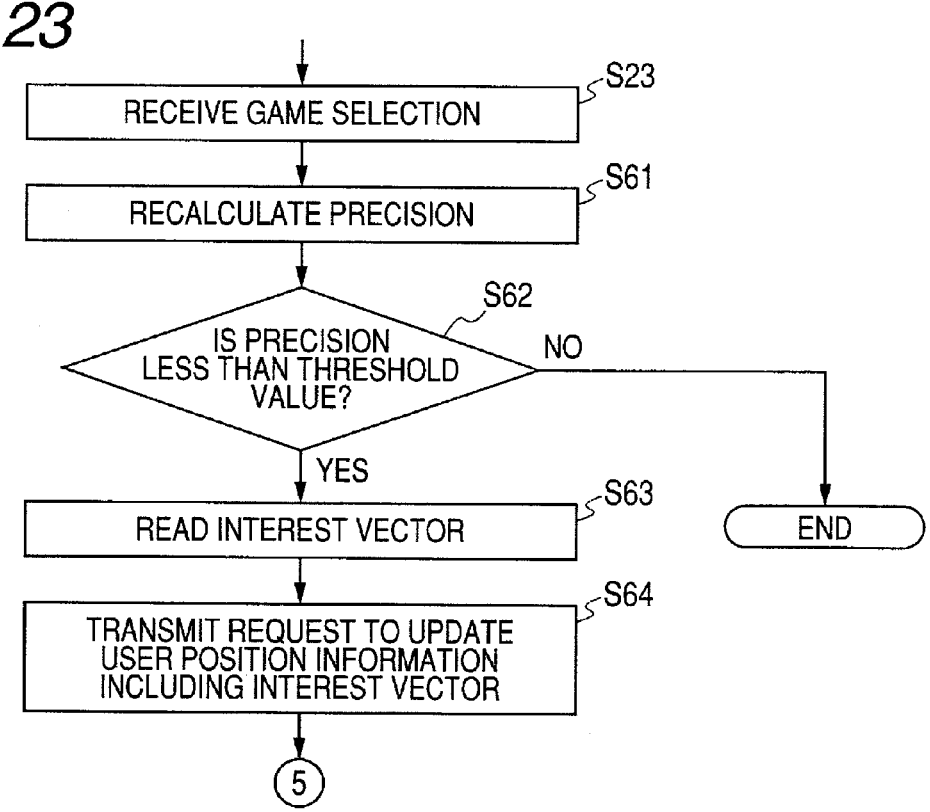

CONTENTS INFORMATION SEARCH CONTROL SYSTEM AND CONTENTS INFORMATION SEARCH CONTROL METHOD

CROSS REFERENCE TO RELATED APPLICATION

The present invention relates to subject matter contained in Japanese Patent Application No. 2007-095086, filed on Mar. 30, 2007, the disclosure of which is expressly incorporated herein by reference in the entirety.

BACKGROUND OF THE INVENTION

1. Field of the Invention

The present invention relates to a contents information search control system and a contents information search control method that can be used when contents, such as game software, is automatically searched with a terminal, such as a cellular phone.

2. Description of the Related Art

In recent years, a service that allows a terminal, such as a cellular phone, to connect to Internet, and to select and use contents, such as game software, comes into wide use. In such a service, when desired contents, for example, contents, such as game software, is searched, there is not a little possibility that a user's purpose is not clear. Accordingly, a server that receives a search request may need to automatically search and present contents according to a user's preference.

As a method that causes the server to automatically select and provides contents to be expected the user will prefer, for example, there is known a method that predicts desired contents by storing information about preceding access histories of the user in a server and matching with an access history showing a similar tendency to a target access history of the user (for example, see JP-A-2002-108923). In addition, the applicants have suggested an information display system that grasps a user's intention and a contents attribute as position information on the same coordinate axis, and selects contents on the basis of the user's intention (see WO 2006/057356 Pamphlet).

In the service that automatically selects and provides contents, in order to select more contents according to the user's preference, it is important to reflect a change in the user's intention or the storage of previously selected contents. For example, when game software is selected, if a game that the user wants to play changes, it is preferable to change contents to be selected. In addition, when the user exhaustively plays a desired game and does not feel an interest in the game longer, and when he/she wants to expand a target range, it is preferable to increase the range of contents to be selected. To this end, there is a need for a scheme that grasps a contents selection situation as occasion demands and appropriately reflects the contents selection situation in contents to be selected.

According to the method described in JP-A-2002-108923, it is possible to provide a next access destination for each user. However, since the access destination to be presented is selected by matching with the preceding access history showing a similar tendency, it is necessary to store massive history information to meet various preferences of the user, and a load on a system is increased. In addition, if the change in the user's interest or the expansion of the target range is reflected, the fact that the tendency is similar needs to be set as the matching condition. Accordingly, it is actually difficult to reflect the change in the user's interest or the expansion of the target range.

SUMMARY OF THE INVENTION

The invention has been finalized in order to solve the above-described problems, and it is an object of the invention to provide a contents information search control system and a contents information search control method that can reflect a change in user's interest or expansion of a target range of an interest when contents, such as game software, is automatically searched with a terminal, such as a cellular phone, according to a user's preference.

According to a first aspect of the invention, there is provided a contents information search control system that is provided in a contents server to allow the contents server to automatically search contents when receiving a search request from a user terminal and display the searched contents on the user terminal. The contents information search control system includes: a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes; a contents position information storage unit that, for contents to be transmitted from the contents server to the user terminal, stores contents position information, in which the attribute of contents assigned by the position information based on the coordinate axes is reflected; a contents search unit that, when the search request is received from the user terminal, reads out user position information of a user who operates the user terminal, and a search condition corresponding to the user from the user information storage unit, searches contents, which satisfies the condition, from the contents position information storage unit by applying the user position information to the search condition, and transmits information about at least part of the contents specified by the search to the user terminal; and a search condition update unit that acquires an interest vector, which is generated from contents position information of contents previously selected by the user, and assigns the user's interest as vector information on the coordinate axes, and when the interest vector satisfies a predetermined condition, in reflection of the interest vector, updates the search condition corresponding to the user stored in the user information storage unit.

According to a second aspect of the invention, there is provided a contents information search control system that is provided in a contents server to allow the contents server to automatically search contents when receiving a search request from a user terminal and display the searched contents on the user terminal. The contents information search control system includes: a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes; a contents position information storage unit that, for contents to be transmitted from the contents server to the user terminal, stores contents position information, in which the attribute of contents assigned by the position information based on the coordinate axes is reflected; a user position information transmitting unit that transmits user position information of a user, who operates the user terminal, so as to store in the user terminal; a contents position information transmitting unit that transmits, to the user terminal, contents position information of contents selected by the user, who operates the user terminal, so as to generate an interest vector, which assigns the user's interest as vector information on the coordinate axes, by adding contents position information previously selected by the user in the user terminal; a contents search unit that, when the search request appended with the user position information stored in the user terminal and the interest vector generated in the user terminal is received from the user terminal, reads out a search condition corresponding to the user, who operates the user terminal, from the user information storage unit, searches contents, which satisfies the condition, from the contents position information storage unit by applying the user position information to the search condition, and transmits information about at least part of the contents specified by the search to the user terminal; and a search condition update unit that, when the interest vector satisfies a predetermined condition, in reflection of the interest vector, updates the search condition corresponding to the user stored in the user information storage unit.

According to the first and second aspects of the invention, a change in the user's interest is quantitatively grasped as the interest vector, and when the interest vector satisfies the predetermined condition, the search condition is updated to reflect the change in the user's interest in the search condition. In the first aspect of the invention, the interest vector is generated in the contents server, while in the second aspect of the invention, the interest vector is generated in the user terminal.

In the contents information search control system according to the first or second aspect of the invention, the user information storage unit may assign, as the search condition of a user, a search range is within a predetermined distance from a point to be specified by the user position information of the user, and the search condition update unit may update the search condition such that the sum of a distance from a point to be specified by the user position information and a distance from a point to be specified by position information of a position on the interest vector is within a predetermined value.

The contents information search control system according to the first or second aspect of the invention may further include a position information update unit that, when the interest vector satisfies a predetermined condition, updates the position information corresponding to the user stored in the user information storage unit in reflection of the interest vector.

According to the first and second aspects of the invention, the search range is set to be within an ellipse, which passes a point indicating the user position and a point on the interest vector (or a cube having an elliptical section). Therefore, contents that exist at a position in a change direction of the user's interest can be searched. In addition, the user position may be moved along the direction of the interest vector, thereby changing the search range.

According to a third aspect of the invention, there is provided a contents information search control system that is provided in a contents server to allow the contents server to automatically search contents when receiving a search request from a user terminal and display the searched contents on the user terminal. The contents information search control system includes: a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes; a contents position information storage unit that, for contents to be transmitted from the contents server to the user terminal, stores contents position information, in which the attribute of contents assigned by the position information based on the coordinate axes is reflected; a contents search unit that, when the search request is received from the user terminal, reads out user position information of a user who operates the user terminal, and a search condition corresponding to the user from the user information storage unit, searches contents, which satisfies the condition, from the contents position information storage unit by applying the user position information to the search condition, and transmits information about at least part of the contents specified by the search to the user terminal; and a search condition update unit that acquires distance information, which is calculated from a distance between the user position information and contents position information of contents previously selected by the user, and assigns a difference between the user's intention to be specified by the user position information and the contents previously selected by the user as a distance on the coordinate axes, and when the distance information satisfies a predetermined condition, updates search condition corresponding to the user stored in the user information storage unit in reflection of the interest vector.

According to a fourth aspect of the invention, there is provided a contents information search control system that is provided in a contents server to allow the contents server to automatically search contents when receiving a search request from a user terminal and display the searched contents on the user terminal. The contents information search control system includes: a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes; a contents position information storage unit that, for contents to be transmitted from the contents server to the user terminal, stores contents position information, in which the attribute of contents assigned by the position information based on the coordinate axes is reflected; a user position information transmitting unit that transmits user position information of a user, who operates the user terminal, so as to store in the user terminal; a contents position information transmitting unit that transmits, to the user terminal, contents position information of contents selected by the user, who operates the user terminal, so as to calculate distance information, which assigns a difference between the user's intention to be specified by the user position information and contents previously selected by the user as a distance on the coordinate axes, from a distance between the user position information in the user terminal and contents position information of the contents previously selected by the user; a contents search unit that, when the search request appended with the user position information stored in the user terminal and the distance information calculated in the user terminal is received from the user terminal, reads out the search condition corresponding to the user, who operates the user terminal, from the user information storage unit, searches contents, which satisfies the condition, from the contents position information storage unit by applying the user position information to the search condition, and transmits information about at least part of the contents specified by the search to the user terminal; and a search condition update unit that, when the distance information satisfies a predetermined condition, updates the search condition corresponding to the user stored in the user information storage unit in reflection of the distance information.

According to the third and fourth aspects of the invention, the expansion of the target range of the user's interest is quantitatively grasped as the distance information, and when the distance information satisfies the predetermined condition, the search condition is updated to reflect the expansion of the target range of the user's interest in the search condition. In the third aspect of the invention, the distance information is calculated in the contents server, while in the fourth aspect of the invention, the distance information is calculated in the user terminal.

In the contents information search control system according to the third or fourth aspect of the invention, the user information storage unit may assign, as the search condition of a user, a search range is within a predetermined distance from a point to be specified by the user position information of the user, and the search condition update unit may update the search condition such that a search range is out of a predetermined distance from a point to be specified by the user position information and within a predetermined distance to be specified by the distance information.

According to the third and fourth aspects of the invention, the search range that was set to be within a circle having a predetermined radius from a point indicating the user position (or a cube having a circular section) is changed to be within a ring-shaped region, which is defined by the outside of the circle as the previous search range and the inside of an outer circle (or a cube having a circular section). Therefore, the search range of contents can be expanded according to the expansion of the target range of the user's interest.

According to a fifth aspect of the invention, there is provided a contents information search control system that is provided in a contents server to allow the contents server to automatically search contents when receiving a search request from a user terminal and display the searched contents on the user terminal. The contents information search control system includes: a user information storage unit that, using at least two coordinate axes based on a component for specifying a user s interest, for each user, stores user position information for assigning a user's intention as position information based on the coordinate axes, and a search condition when a contents search request is received from a user assigned by the position information based on the coordinate axes; a contents position information storage unit that, for contents to be transmitted from the contents server to the user terminal, stores contents position information, in which the attribute of contents assigned by the position information based on the coordinate axes is reflected; a contents search unit that, when the search request is received from the user terminal, reads out user position information of a user who operates the user terminal, and a search condition corresponding to the user from the user information storage unit, searches contents, which satisfies the condition, from the contents position information storage unit by applying the user position information to the search condition, and transmits information about at least part of the contents specified by the search to the user terminal; a first search condition update unit that acquires an interest vector, which is generated from contents position information of contents previously selected by the user and assigns the user's interest as vector information on the coordinates, and when the interest vector satisfies a predetermined condition, updates the search condition corresponding to the user stored in the user information storage unit in reflection of the interest vector; and a second search condition update unit that acquires distance information, which is calculated from a distance between the user position information and the contents position information of the contents previously selected by the user, and assigns a difference between the user's intention to be specified by the user position information and the contents previously selected by the user as a distance on the coordinate axes, and when the distance information satisfies a predetermined condition, updates the search condition corresponding to the user stored in the user information storage unit in reflection of the interest vector.

According to a sixth aspect of the invention, there is provided a contents information search control system that is provided in a contents server to allow the contents server to automatically search contents when receiving a search request from a user terminal and display the searched contents on the user terminal. The contents information search control system includes: a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes; a contents position information storage unit that, for contents to be transmitted from the contents server to the user terminal, stores contents position information, in which the attribute of contents assigned by the position information based on the coordinate axes is reflected; a user position information transmitting unit that transmits user position information of a user, who operates the user terminal, so as to store in the user terminal; a contents position information transmitting unit that transmits, to the user terminal, contents position information of contents selected by the user who operates the user terminal, so as to generate an interest vector, which assigns the user's interest as a vector information on the coordinate axes, by adding contents position information of contents previously selected by the user in the user terminal, and to calculate distance information, which assigns a difference between the user's interest to be specified by the user position information and the contents previously selected by the user as a distance on the coordinate axes, from a distance between the user position information in the user terminal and the contents position information of the contents previously selected by the user; a contents search unit that, when the search request appended with the user position information stored in the user terminal, the interest vector generated in the user terminal, and the distance information calculated in the user terminal is received from the user terminal, reads out the search condition corresponding to the user, who operates the user terminal, from the user information storage unit, searches contents, which satisfies the condition, from the contents position information storage unit by applying the user position information to the search condition, and transmits information about at least part of the contents specified by the search to the user terminal; and a first search condition update unit that, when the interest vector satisfies a predetermined condition, updates the search condition corresponding to the user stored in the user information storage unit in reflection of the interest vector; and a second search condition update unit that, when the distance information satisfies a predetermined condition, updates the search condition corresponding to the user stored in the user information storage unit in reflection of the interest vector.

According to the fifth and sixth aspects of the invention, a change in the user's interest is quantitatively grasped as the interest vector, and when the interest vector satisfies the predetermined condition, the search condition is updated to reflect the change in the user's interest in the search condition. At the same time, the expansion of the target range of the user's interest is quantitatively grasped as the distance information, and when the distance information satisfies the predetermined condition, the search condition is updated to reflect the expansion of the target range of the user's interest in the search condition. In the fifth aspect of the invention, the interest vector and the distance information are generated in the contents server, while in the sixth aspect of the invention, the interest vector and the distance information are generated in the user terminal.

In the contents information search control system according to the fifth or sixth aspect of the invention, the user information storage unit may assign, as the search condition of a user, a search range is within a predetermined distance from a point to be specified by the user position information of the user, the first search condition update unit may update the search condition such that the sum of a distance from a point to be specified by the user position information and a distance from a point to be specified by position information of a position on the interest vector is within a predetermined value, and the second search condition update unit may update the search condition such that a search range is out of a predetermined distance from a point to be specified by the user position information and within a predetermined distance to be specified by the distance information.

The contents information search control system according to the fifth or sixth aspect of the invention may further include a position information update unit that, when the interest vector and the distance information satisfy a predetermined condition, updates the position information corresponding to the user stored in the user information storage unit in reflection of the interest vector and the distance information.

According to the fifth and sixth aspects of the invention, the search range is set to be within an ellipse, which passes a point indicating the user position and a point on the interest vector (or a cube having an elliptical section). Therefore, the contents that exist at a position in a change direction of the user's interest can be searched. In addition, the search range that was to be set within a circle having a predetermined radius from the point indicating the user position (or a cube having a circular section) is updated to be within a ring-shaped region, which is defined by the outside of the circle as the previous search range and the inside of an outer circle (or a cube having a circular section). Therefore, the search range of contents can be expanded according to the expansion of the target range of the user's interest. Furthermore, the user position may be moved along the direction of the interest vector in reflection of the distance information, thereby changing the search range.

The contents information search control system according to each of the first to sixth aspects of the invention may also be grasped as a contents information search control method that is executed by the contents information search control system.

As a contents information search control method that corresponds to the first aspect of the invention, there is provided a contents information search control method that causes a contents server, which receives a search request from a user terminal, to automatically search contents and to display the contents on the user terminal. The contents server includes a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes, and a contents position information storage unit that, for contents to be transmitted from the contents server to the user terminal, stores contents position information, in which the attribute of contents assigned by the position information based on the coordinate axes is reflected. The contents information search control method includes: causing the contents server to receive the search request from the user terminal; causing the contents server to read out user position information of a user who operates the user terminal, and a search condition corresponding to the user from the user information storage unit, to search contents, which satisfies the condition, from the contents position information storage unit by applying the user position information to the search condition, and to transmit information about at least part of the contents specified by the search to the user terminal; and causing the contents server to acquire an interest vector, which is generated from contents position information of contents previously selected by the user and assigns the user's interest as a vector information on the coordinate axes, and when the interest vector satisfies a predetermined condition, to update the search condition corresponding to the user stored in the user information storage unit in reflection of the interest vector.

As a contents information search control method that corresponds to the second aspect of the invention, there is provided a contents information search control method that causes a contents server, which receives a search request from a user terminal, to automatically search contents and to display the contents on the user terminal. The contents server includes a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes, and a contents position information storage unit that, for contents to be transmitted from the contents server to the user terminal, stores contents position information, in which the attribute of contents assigned by the position information based on the coordinate axes is reflected. The user terminal stores the same user position information as that in the contents server, and an interest vector that is generated by adding contents position information of contents received from the contents server and selected by a user who operates the user terminal. The contents information search control method includes: causing the contents server to receive, from the user terminal, the search request appended with the user position information and the interest vector; causing the contents server to read out a search condition corresponding to the user, who operates the user terminal, from the user information storage unit, to search contents, which satisfies the condition, from the contents position information storage unit by applying the user position information to the search condition, and to transmit information at least part of the contents specified by the search to the user terminal; and when the interest vector satisfies a predetermined condition, causing the contents server to update the search condition corresponding to the user stored in the user information storage unit in reflection of the interest vector.

The user terminal may store an activation frequency that, when a request to automatically search contents is received, is the basis of activation of the search request to the contents server. The contents information search control method may further include: when an arithmetic operation is performed to generate the interest vector, causing the user terminal to update activation frequency according to the length of the generated interest vector; when the request to automatically search contents is received, causing the user terminal to activate the search request to the contents server; and causing the user terminal to receive the information about at least part of the contents specified in the contents server, and to display the information on a display of the user terminal. The user terminal may activate the search request to the contents server at a predetermined ratio corresponding to the activation frequency according to how many times the request to automatically search contents is received, and when the search request is not activated, may randomly select contents from information about contents stored in the user terminal, and display the information about at least part of the specified contents on the display of the user terminal.

As a contents information search control method that corresponds to the third aspect of the invention, there is provided a contents information search control method that causes a contents server, which receives a search request from a user terminal, to automatically search contents and to display the contents on the user terminal. The contents server includes a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes, and a contents position information storage unit that, for contents to be transmitted from the contents server to the user terminal, stores contents position information, in which the attribute of contents assigned by the position information based on the coordinate axes is reflected. The contents information search control method includes: causing the contents server to receive the search request from the user terminal; causing the contents server to read out user position information of a user who operates the user terminal, and a search condition corresponding to the user from the user information storage unit, to search contents, which satisfies the condition, from the contents position information storage unit by applying the user position information to the search condition, and to transmit information about at least part of the contents specified by the search to the user terminal; and causing the contents server to acquire distance information, which is calculated from a distance between the user position information and contents position information of contents previously selected by the user, and assigns a difference between the user's interest to be specified by the user position information and the contents previously selected by the user as a distance on the coordinate axes, and when the distance information satisfies a predetermined condition, to update the search condition corresponding to the user stored in the user information storage unit in reflection of the distance information.

As a contents information search control method that corresponds to the fourth aspect of the invention, there is provided a contents information search control method that causes a contents server, which receives a search request from a user terminal, to automatically search contents and to display the contents on the user terminal. The contents server includes a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes, and a contents position information storage unit that, for contents to be transmitted from the contents server to the user terminal, stores contents position information, in which the attribute of contents assigned by the position information based on the coordinate axes is reflected. The user terminal stores the same user position information as that in the contents server, and distance information, which is calculated from a distance between the user position information and contents position information of contents previously selected by the user, and assigns a difference between the user's interest to be specified by the user position information and the contents previously selected by the user as a distance on the coordinate axes. The contents information search control method includes: causing the contents server to receive, from the user terminal, the search request appended with the user position information and the distance information; causing the contents server to read out a search condition corresponding to a user, who operates the user terminal, from the user information storage unit, to search contents, which satisfies the condition, from the contents position information storage unit by applying the user position information to the search condition, and to transmit information about at least part of the contents specified by the search to the user terminal; and when the distance information satisfies a predetermined condition, causing the contents server to update the search condition corresponding to the user stored in the user information storage unit in reflection of the distance information.

The user terminal may store an activation frequency that, when a request to automatically search contents is received, is the basis of activation of the search request to the contents server. The contents information search control method may further include: when an arithmetic operation is performed to calculate the distance information, causing the user terminal to update the activation frequency according to the value of the calculated distance information; when the request to automatically search contents is received, causing the user terminal to activate the search request to the contents server; and causing the user terminal to receive the information about at least part of the contents specified in the contents server, and to display the information on a display of the user terminal. The user terminal may activate the search request to the contents server at a predetermined ratio corresponding to the activation frequency according to how many times the request to automatically search contents is received, and when the search request is not activated, may randomly select contents from information about contents stored in the user terminal, and display the information about at least part of the specified contents on the display of the user terminal.

As a contents information search control method that corresponds to the fifth aspect of the invention, there is provided a contents information search control method that causes a contents server, which receives a search request from a user terminal, to automatically search contents and to display the contents on the user terminal. The contents server includes a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes, and a contents position information storage unit that, for contents to be transmitted from the contents server to the user terminal, stores contents position information, in which the attribute of contents assigned by the position information based on the coordinate axes is reflected. The contents information search control method includes: causing the contents server to receive the search request from the user terminal; causing the contents server to read out user position information of a user who operates the user terminal, and a search condition corresponding to the user from the user information storage unit, to search contents, which satisfies the condition, from the contents position information storage unit by applying the user position information to the search condition, and to transmit information about at least part of the contents specified by the search to the user terminal; causing the contents server to acquire an interest vector, which is generated from contents position information of contents previously selected by the user and assigns the user s interest as a vector information on the coordinate axes, and when the interest vector satisfies a predetermined condition, to update the search condition corresponding to the user stored in the user information storage unit in reflection of the interest vector; and causing the contents server to acquire distance information, which is calculated from a distance between the user position information and contents position information of contents previously selected by the user, and assigns a difference between the user's interest to be specified by the user position information and the contents previously selected by the user as a distance on the coordinate axes, and when the distance information satisfies a predetermined condition, to update the search condition corresponding to the user stored in the user information storage unit in reflection of the distance information.

As a contents information search control method that corresponds to the sixth aspect of the invention, there is provided a contents information search control method that causes a contents server, which receives a search request from a user terminal, to automatically search contents and to display the contents on the user terminal. The contents server includes a user information storage unit that, using at least two coordinate axes based on a component for specifying a user's interest, for each user, stores user position information for assigning a user's intention as position information based on the coordinate axes, and a search condition when a contents search request is received from a user assigned by the position information based on the coordinate axes, and a contents position information storage unit that, for contents to be transmitted from the contents server to the user terminal, stores contents position information, in which the attribute of contents assigned by the position information based on the coordinate axes is reflected. The user terminal stores the same user position information as that in the contents server, an interest vector that is generated by adding contents position information of contents received from the contents server and selected by a user who operates the user terminal, and distance information, which is calculated from a distance between the user position information and contents position information of contents previously selected by the user, and assigns a difference between the user's interest to be specified by the user position information and the contents previously selected by the user as a distance on the coordinate axes. The contents information search control method includes: causing the contents server to receive, from the user terminal, the search request appended with the user position information, the interest vector, and the distance information; causing the contents server to read out a search condition corresponding to the user, who operates the user terminal, from the user information storage unit, to search contents, which satisfies the condition, from the contents position information storage unit by applying the user position information to the search condition, and to transmit information at least part of the contents specified by the search to the user terminal; when the interest vector satisfies a predetermined condition, causing the contents server to update the search condition corresponding to the user stored in the user information storage unit in reflection of the interest vector; and when the distance information satisfies a predetermined condition, causing the contents server to update the search condition corresponding to the user stored in the user information storage unit in reflection of the distance information.

The user terminal may store an activation frequency that, when a request to automatically search contents is received, is the basis of activation of the search request to the contents server. The contents information search control method may further include: when an arithmetic operation is performed to generate the interest vector, causing the user terminal to update activation frequency according to the length of the generated interest vector; when an arithmetic operation is performed to calculate the distance information, causing the user terminal to update the activation frequency according to the value of the calculated distance information; when the request to automatically search contents is received, causing the user terminal to activate the search request to the contents server; and causing the user terminal to receive the information about at least part of the contents specified in the contents server, and to display the information on a display of the user terminal. The user terminal may activate the search request to the contents server at a predetermined ratio corresponding to the activation frequency according to how many times the request to automatically search contents is received, and when the search request is not activated, may randomly select contents from information about contents stored in the user terminal, and display the information about at least part of the specified contents on the display of the user terminal.

According to the contents information search control method that corresponds to each of the second, fourth, and sixth aspects of the invention, since the user terminal receives the automatic search request, if the interest vector or the distance information is transmitted to the contents server, and the search request is input, an excessive load may be applied to the contents server. In order to prevent this problem, when the user terminal receives the automatic search request, the activation frequency that the search request to the contents server is activated is set, and the change in the interest vector or distance information is reflected in the activation frequency. Then, when the user's interest is changed or the target range of the interest is expanded, the frequency that the automatic search is performed is increased. Therefore, the load on the contents server can be suppressed, and at the same time the automatic search can be performed according to the change the user's interest or the expansion of the target range of the interest.

In the contents information search control method that corresponds to each of the first to sixth aspects of the invention, the user terminal may store a precision indicating a ratio that the user who operates the user terminal selects high-priority contents among the contents displayed by the automatic search. The contents information search control method may further include: when the precision satisfies a predetermined condition, causing the user terminal to transmit, to the contents server, a request to change the user position information appended with at least one of the interest vector or the distance information; and causing the contents server to update the user position information corresponding to the user stored in the user information storage unit in reflection of the interest vector or the distance information.

As the result of the automatic search, when the user's selection is different from the priority by the automatic search, user position information may not be appropriate as the basis. Accordingly, when the precision is less than a threshold value, the user position is changed according to the selection tendency, such that contents according to a user's preference can be selected.

In the contents information search control method that corresponds to each of the first to sixth aspects of the invention, the user terminal may store a precision indicating a ratio that the user who operates the user terminal selects high-priority contents among the contents displayed by the automatic search. The contents information search control method may further include: when the precision satisfies a predetermined condition, causing the user terminal to update the activation frequency; and when the search request is received from the user terminal, causing the contents server to update the user position information corresponding to the user stored in the user information storage unit in reflection of at least one of the interest vector and the distance information appended to the search request.

When the precision between the result of the automatic search and the user's selection is less than the threshold value, as described above, the user position may be directly changed. Meanwhile, when the activation frequency of the automatic search is set and when the user position is changed in reflection of the interest vector during the automatic search is performed, the activation frequency is changed to increase the frequency that the user position is changed. As a result, contents according to the user's preference can be selected.

According to the invention, in a service that automatically selects and provides contents, automatic search of contents according to the user's preference can be performed in reflection of a change in user's interest or expansion of a target range of the interest. The invention is particularly applied to a service that allows a terminal, such as a cellular phone, to connect to Internet and to select and use contents, such as game software.

BRIEF DESCRIPTION OF THE DRAWINGS

FIG. 13 is a sixth diagram showing an example where automatic search is performed by the contents information search control system according to the invention;

FIG. 20 is a third flowchart showing a process flow when automatic search is performed by the contents information search control system according to the invention;

FIG. 21 is a fourth flowchart showing a process flow when automatic search is performed by the contents information search control system according to the invention;

FIG. 22 is a fifth flowchart showing a process flow when automatic search is performed by the contents information search control system according to the invention;

FIG. 23 is a first flowchart showing a process flow when user position information is changed by the contents information search control system according to the invention;

DESCRIPTION OF PREFERRED EMBODIMENTS

Hereinafter, preferred embodiments of the invention will be described in detail with reference to the drawings. Although, in the following description, a case where game software is searched with a user terminal, such as a cellular phone, has been described, the embodiments are just illustrative, but the invention is not limited to the embodiments.

Figure 1:
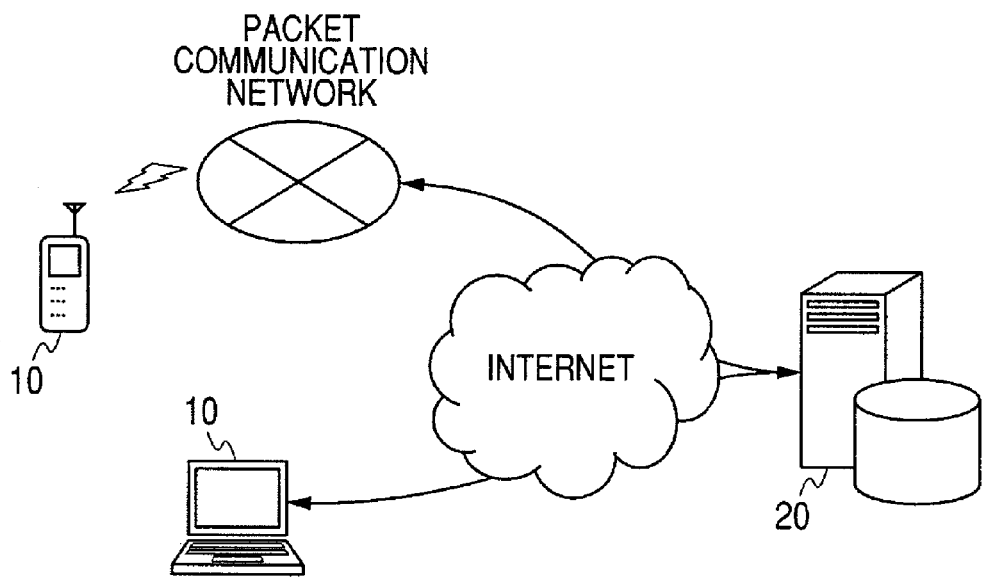
FIG. 1 is a diagram showing the outline of an embodiment of a contents information search control system according to the invention.
Figure 2:
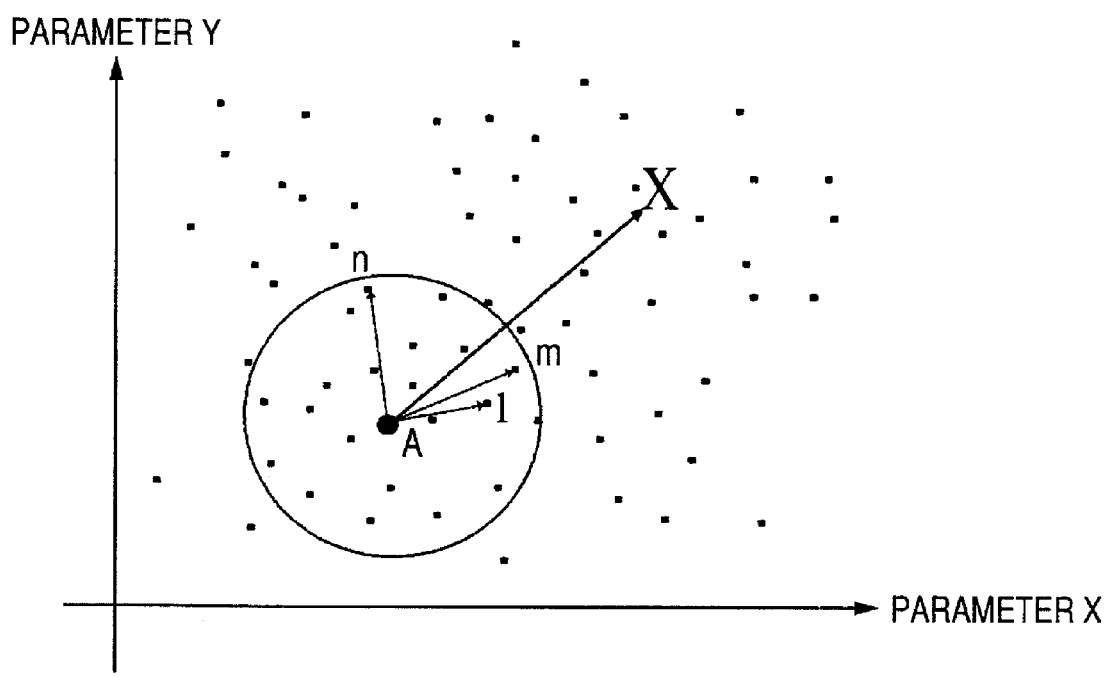
FIG. 2 is a diagram showing an example where an interest vector, which is used in the contents information search control system according to the invention, is generated.
Figure 3:
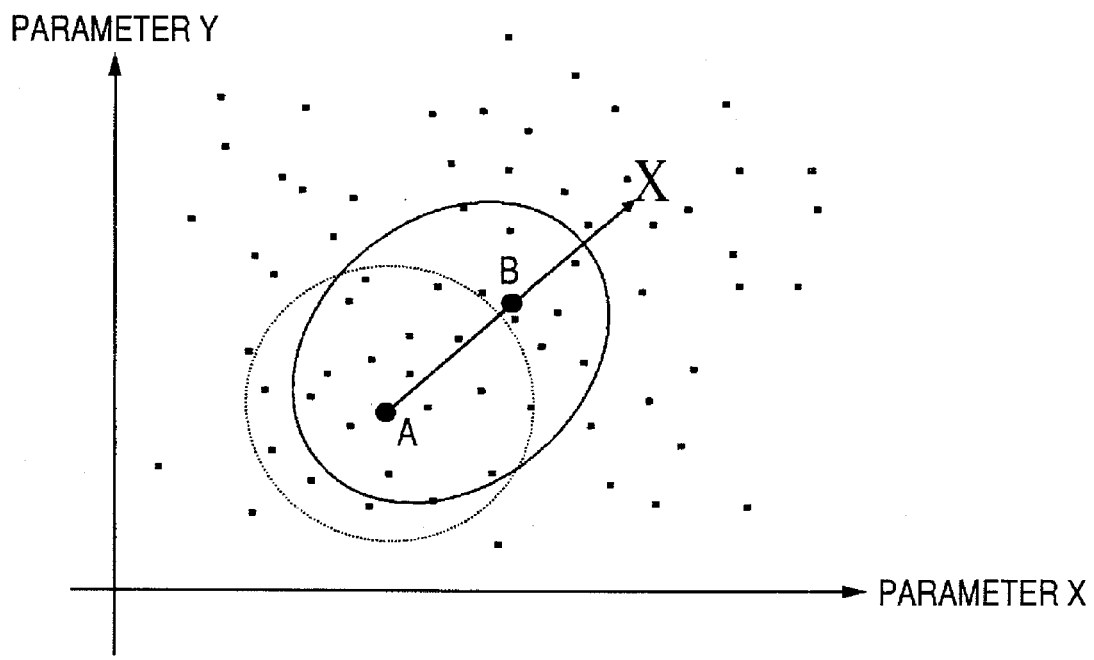
FIG. 3 is a diagram showing an example where a search range is changed by an interest vector in the contents information search control system according to the invention.

FIG. 1 is a diagram showing the outline of an embodiment of a contents information search control system according to the invention. FIG. 2 is a diagram showing an example where an interest vector, which is used in the contents information search control system according to the invention, is generated. FIG. 3 is a diagram showing an example where a search range is changed by an interest vector in the contents information search control system according to the invention. FIG.

Figure 5:
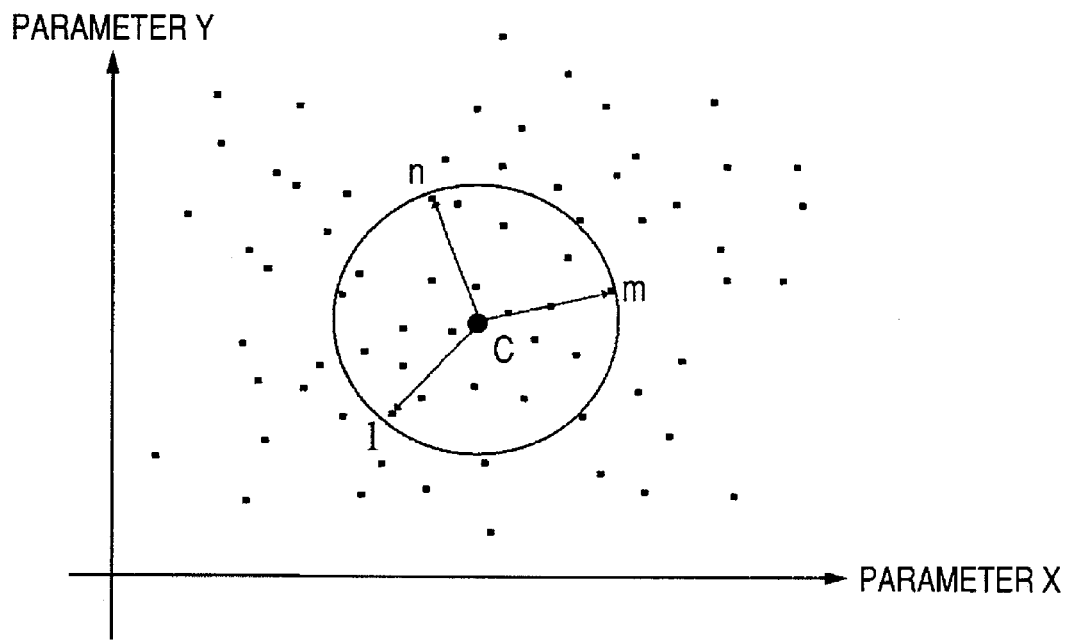
FIG. 5 is a diagram showing an example where distance information, which is used in the contents information search control system according to the invention, is calculated.
Figure 6:
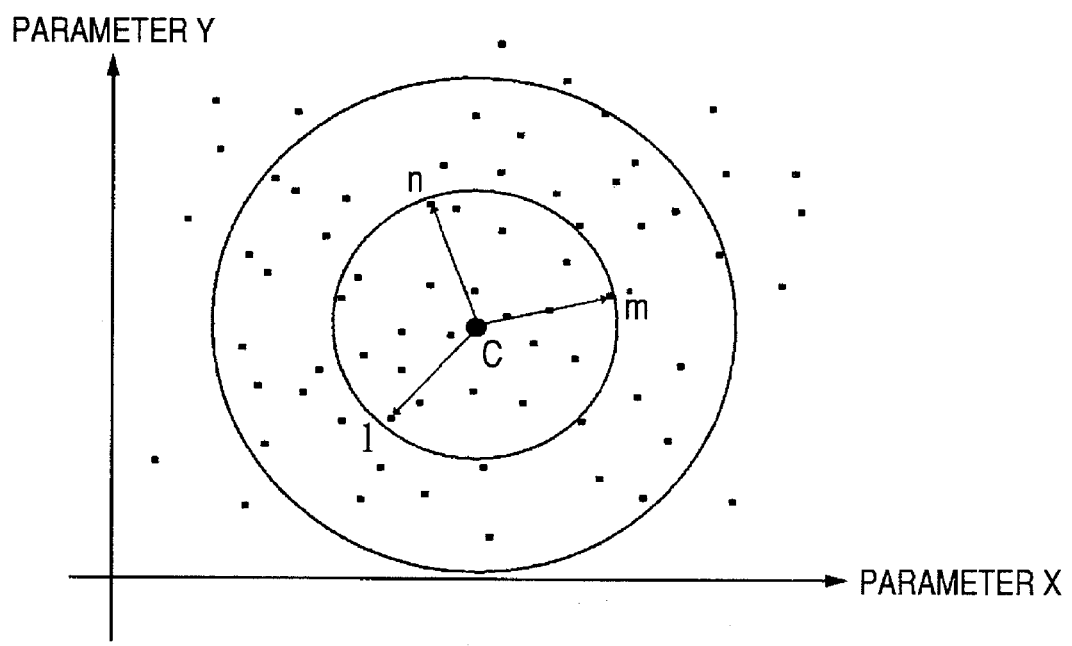
FIG. 6 is a diagram showing an example where a search range is changed by distance information in the contents information search control system according to the invention.
Figure 7:
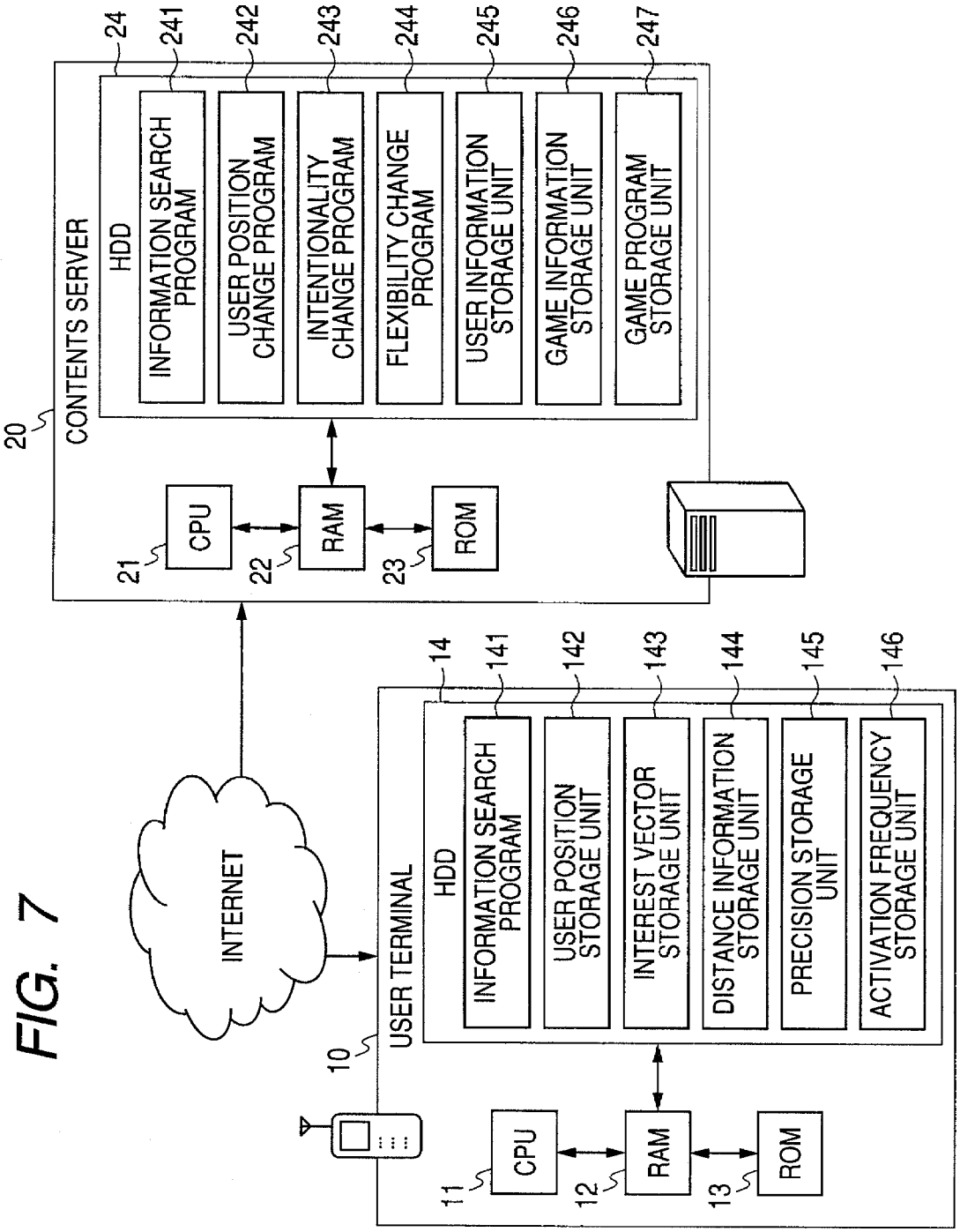
FIG. 7 is a block diagram showing the configuration of the contents information search control system according to the invention.
Figure 15:
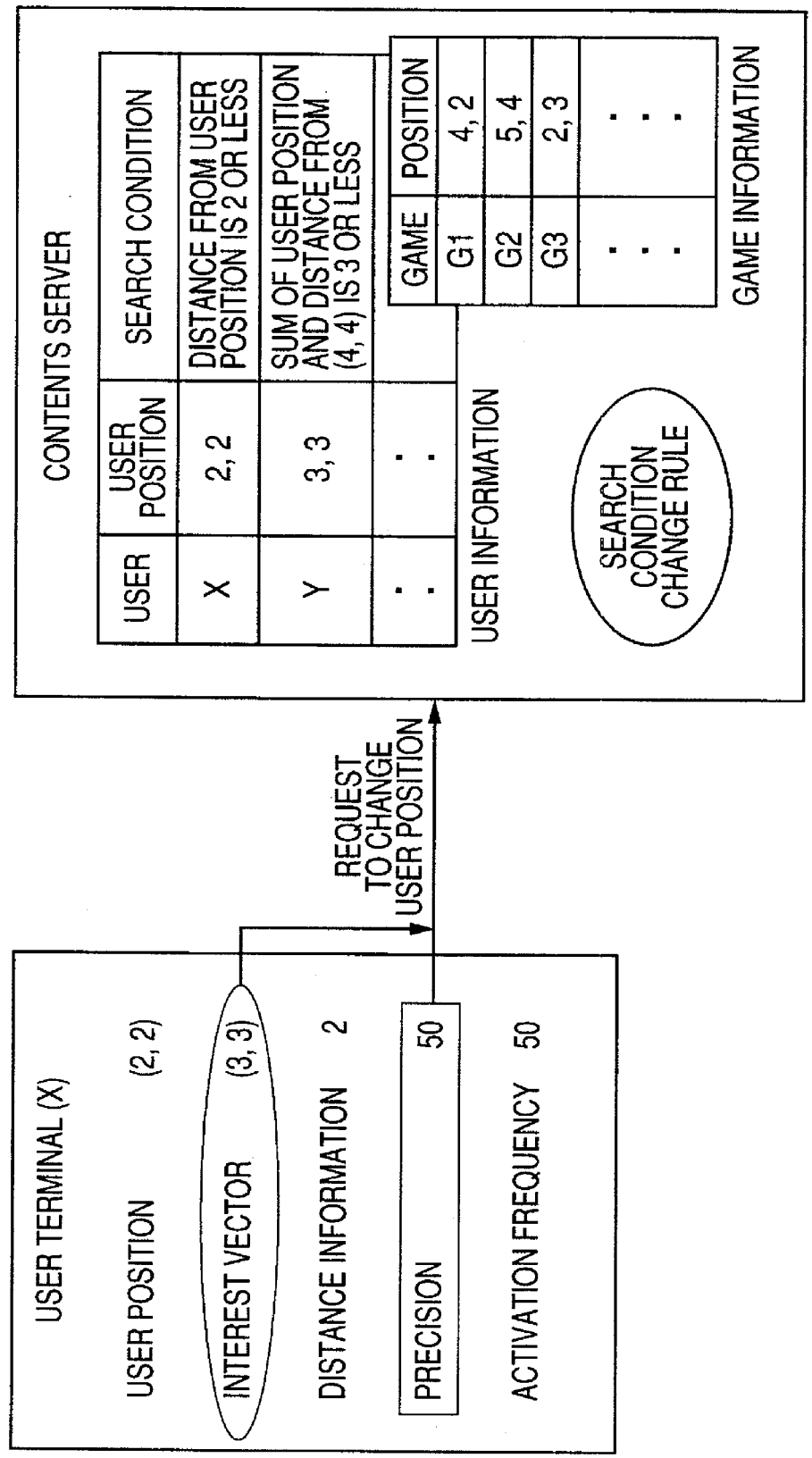
FIG. 15 is a first diagram showing an example where user position information is changed by the contents information search control system according to the invention.
Figure 16:
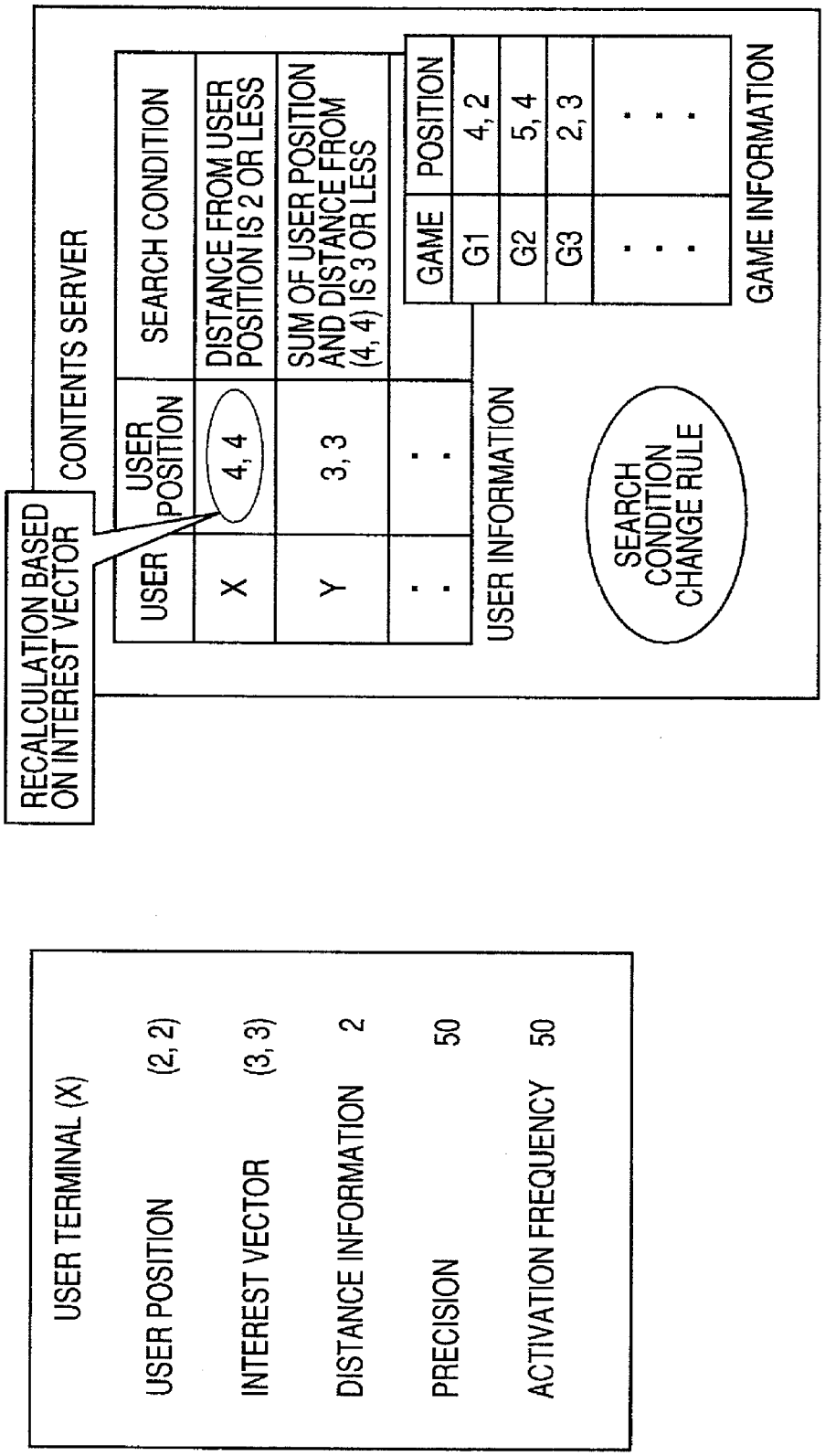
FIG. 16 is a second diagram showing an example where user position information is changed by the contents information search control system according to the invention.
Figure 17:
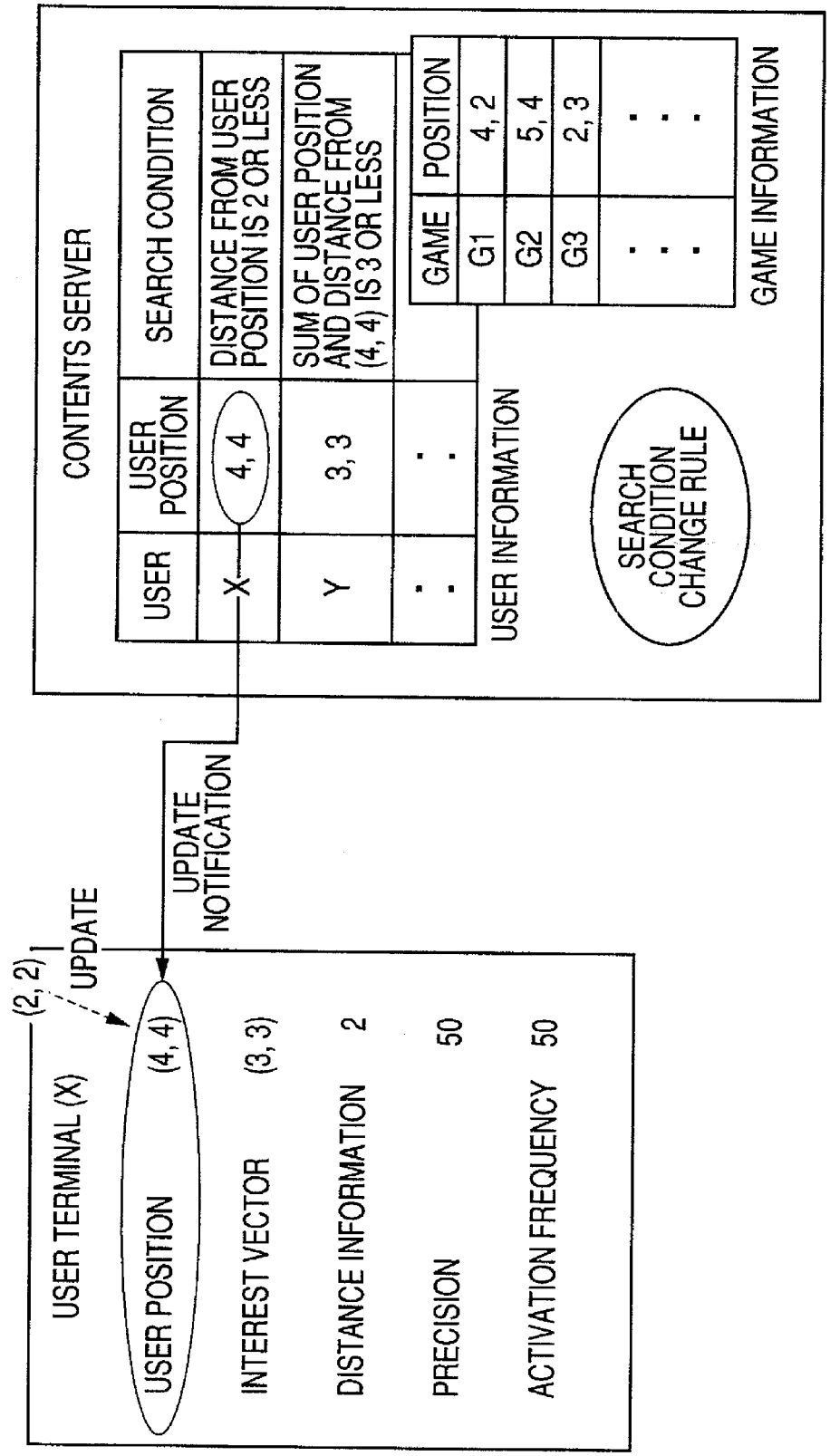
FIG. 17 is a third diagram showing an example where user position information is changed by the contents information search control system according to the invention.
Figure 24:
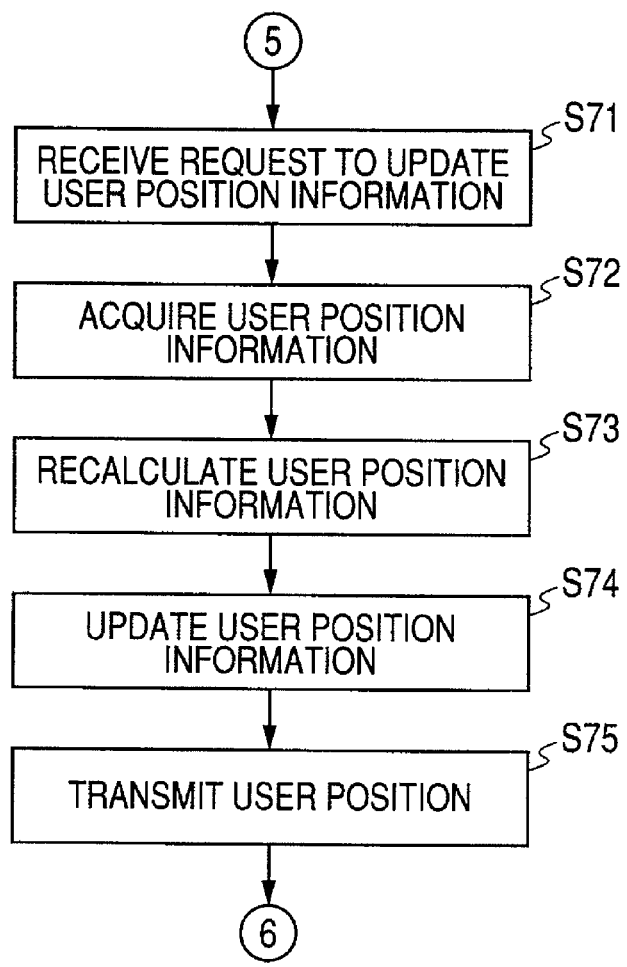
FIG. 24 is a second flowchart showing a process flow when user position information is changed by the contents information search control system according to the invention.
Figure 25:
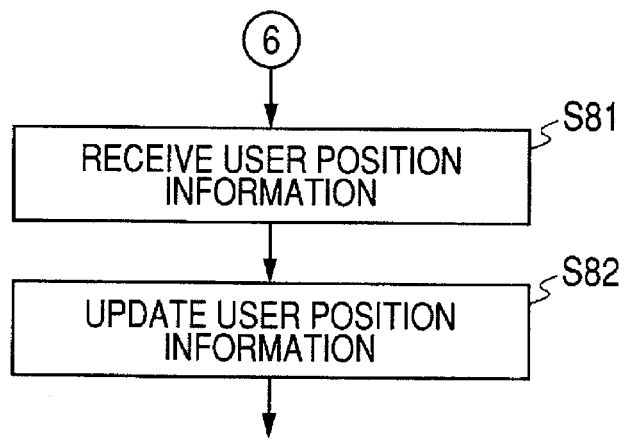
FIG. 25 is a third flowchart showing a process flow when user position information is changed by the contents information search control system according to the invention.
Figure 26:
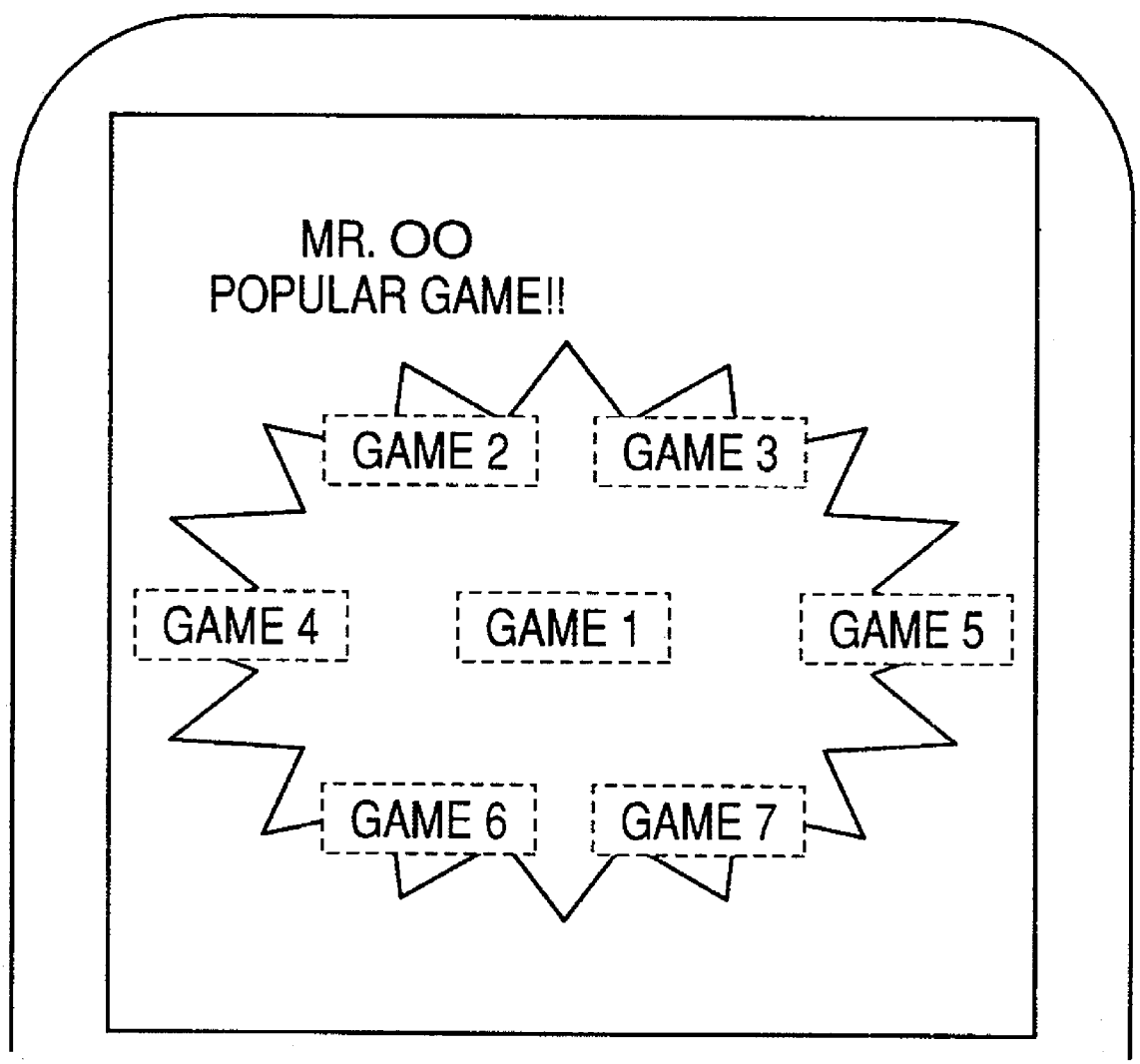
FIG. 26 is a diagram showing an example of an automatic search result that is displayed on a user terminal by the contents information search control system according to the invention.

4 is a diagram showing an example where a user position moves along an interest vector in the contents information search control system according to the invention. FIG. 5 is a diagram showing an example where distance information, which is used in the contents information search control system according to the invention, is calculated. FIG. 6 is a diagram showing an example where a search range is changed by distance information in the contents information search control system according to the invention. FIG. 7 is a block diagram showing the configuration of the contents information search control system according to the invention. FIGS. 8 to 14 are first to seventh diagrams showing an example where automatic search is performed by the contents information search control system according to the invention. FIGS. 15 to 17 are first to third diagrams showing an example where user position information is changed by the contents information search control system according to the invention. FIGS. 18 to 22 are first to fifth flowcharts showing a process flow when automatic search is performed by the contents information search control system according to the invention. FIGS. 23 to 25 are first to third flowcharts showing a process flow when user position information is changed by the contents information search control system according to the invention. FIG. 26 is a diagram showing the result of an automatic search result that is displayed on a user terminal by the contents information search control system according to the invention.

As shown in FIG. 1, a contents information search control system according to the invention is used to search contents when a user terminal 10, such as a cellular phone or a PC, accesses a contents server 20, and uses contents, such as game software. An automatic search request that requests popular contents is transmitted from the user terminal 10 to the contents server 20. At this time, a user needs to assign a keyword. Then, the contents server 20 automatically searches contents according to a user's preference on the basis of a predetermined search condition, and transmits a list of popular contents to the user terminal 10.

Figure 4:
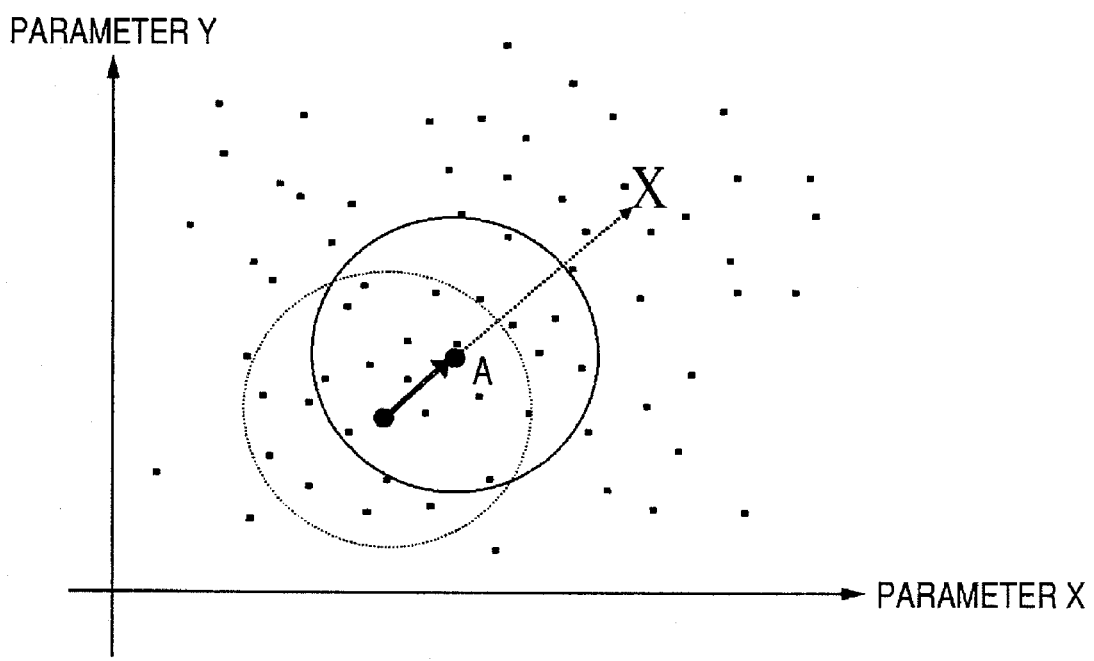
FIG. 4 is a diagram showing an example where a user position moves along an interest vector in the contents information search control system according to the invention.

A contents search method, which is an assumption of the contents information search control system according to the invention, and a basic concept to update a search condition according to a change in user's interest or expansion of a target range of the interest will be described with reference to FIGS. 2 to 6. FIGS. 2 to 4 show a concept of an interest vector that indicates the user's interest and FIGS. 5 and 6 show a concept of distance information that indicates the target range of the user's interest.

FIG. 2 shows an example of a contents search method based on position information on coordinate axes, which is used in the contents information search control system according to the invention. A position, in which the directionality of the user's interest is reflected, and a taxonomical position of contents (in this example, game software) are arranged on the same coordinates. A point 'A' indicates the user position, and other points indicate the positions of the contents.

As a parameter X and a parameter Y that are the coordinate axes, for example, parameters, which represent the attributes of contents in degrees, such as 'easiness' and 'happiness', are used. Although, in this example, contents are arranged on a two-dimensional plane having two parameters according to the attributes, the number of parameters is not limited to two. For example, three parameters or more may be provided, and contents may be arranged in a three-dimensional space or more.

In regards to the user position, the directionality of the user's interest is specified as position information on the coordinates using the parameter X and the parameter Y as the same coordinate axes. The user position determined in such a manner may be set from user registration information in advance, or may be set by collecting history information of contents previously selected by the user and analyzing the tendency of the contents.

Moreover, the parameters that are used in the coordinate axes for determining the user or contents position are based on the directionality of the user's interest and the contents attributes, but they may be based on the user attributes. For example, if the attribute of the age of the user or the frequency is used in the parameters, the user position is determined by the age of the user or the frequency, and the contents position is determined from the tendency value, such as the age of the user who prefers contents or the frequency of the contents.

Selection of contents according to the user's preference is performed by approximating the user position and the contents position. In the example shown in FIG. 2, contents within a predetermined distance from the user position (contents within a concentric circle) is set as a search condition, and contents that satisfies the condition is displayed on the user terminal as a list of contents, which is the popular contents search result by automatic search. Other conditions may be set. For example, as a search condition, an upper limit of a number of contents to be displayed may be set, contents may have high priority as it is close to the center, and a predetermined number of contents may be selected in sequence and displayed as a list.

In the example shown in FIG. 2, it is assumed that the user selects contents from the list of contents, which is displayed as the search result, in an order of l, m, and n. Here, an arithmetic operation that first adds a vector from the point A to the point l and a vector from the point A to the point m on the coordinate axes according to the user's selection, and subsequently adds a vector from the point A to the point n to the calculated vector sum is executed to generate a vector X. The vector X is grasped as an interest vector that indicates the directionality of the interest of the user who selects the contents l, m, and n.

When the vector X exceeds a predetermined length, it is determined that the directionality of the user's interest is changed from an original position, and then the search condition is updated. FIG. 3 shows an example where a search condition is changed, that is, a search range is changed to an ellipse, which is horizontally long toward the direction of the interest vector. In this example, an ellipse is drawn to pass the point A and a point B on the vector X, and contents within that range are set as a new search condition. FIG. 4 shows an example where a search condition is changed, that is, user position information as the center of a circle as the search range moves toward the direction of the interest vector. In this example, the position of the point A moves on the vector X, and contents within a circle having the same radius around the point A after movement are set as a new search condition.

Of the two change methods shown in FIGS. 3 and 4, one or both methods may be used to change the search range. When both methods are used together, for example, each time a new interest vector is generated, the length of the interest vector is checked. If the interest vector satisfies a predetermined condition, fine adjustment may be performed by the method shown in FIG. 3. In addition, if the interest vector satisfies a different condition (for example, a significant difference occurs between a list of searched contents and actually selected contents), the user position itself may be changed by the method shown in FIG. 4.

In the example shown in FIG. 5, it is assumed that the user selects contents l, m, and n from a list of contents, which is displayed as a search result. Here, the distances from a point C to a point l, from the point C to a point m, and from the point C to a point n on the coordinates are calculated, and its average is calculated. When the user selects contents close to the directionality of his/her interest, the average will be decreased. Meanwhile, when the user exhaustively plays game software, which is the contents according to his/her preference, and does not feel an interest in the game longer, the average is gradually increased. As such, the average of the distances to the positions of the contents selected by the user is grasped as distance information that indicates whether or not the target range of the interest of the user who selects the contents l, m, and n is expanded.

When the average represented as the distance information exceeds a predetermined value, it is determined that the target range of the user's interest is expanded from an original range, and then the search condition is changed. FIG. 6 shows an example where a search condition is changed, that is, a search range is changed to a ring-shaped region between a circle having a larger radius and the circle as the past search range. In this example, contents within a distance equal to or larger than the radius of the inner circle and equal to or smaller than the radius of the outer circle from the point C are set as a new search condition.

The search methods described with reference to FIGS. 2 to 6 are an example of a contents search method that is an assumption of the contents information search control system according to the invention. Any calculation method may be used insofar as it can update the search condition in reflection of the change in the user's interest using the interest vector or it can update the search condition according to the expansion of the target range of the interest using the distance information. For example, a method that draws an ellipse or a method using an average may be unlimitedly used. In addition, the interest vector and distance information that are used to update the search condition may be used together, or one of them may be used.

Assuming the basic concept about the above-described search methods, a case where the contents information search control system according to the invention is used to search game software will be described with reference to FIG. 7. The user terminal 10 is a terminal apparatus, such as a cellular phone or PC, which is used by the user and connectable to a network, such as Internet. The contents server 20 is a server computer that is connected to a network, such as Internet, which is operated by a game software provided.

In the user terminal 10, to execute a predetermined process by an application program, such as an information search program 141, stored in an HDD 14, various basic programs for hardware control, such as input/output control, stored in a ROM 13 start, and a CPU 11 performs an arithmetic process while a RAM 12 serves as a work area of the application program. Similarly, in the contents server 20, to execute a predetermined process by an application program, such as an information search program 241, stored in an HDD 24, various basic programs for hardware control, such as input/output control, stored in a ROM 23 start, and a CPU 21 performs an arithmetic process while a RAM 22 serves as a work area of the application program.

The HDD 14 of the user terminal 10 stores the information search program 141 that operates the contents information search control system according to the invention. The HDD 14 is provided with a user position storage unit 142, an interest vector storage unit 143, a distance information storage unit 144, a precision storage unit 145, and an activation frequency storage unit 146.

The information search program 141 is a program that is run when the user terminal 10 accesses the contents server 20 and selects 'default search' of a game. The information search program 141 may be transmitted by the contents server 20 and temporarily stored in the RAM 12 when the 'default search' is selected. Moreover, in the following example, it is assumed that the 'default search', in which the user does not assign a search condition, and the 'auto search', in which the contents server 20 automatically searches contents according to the user's preference, are distinguished from each other, when the user selects the 'default search', the 'auto search' is executed with a predetermined frequency, and in other cases, random search, in which a search condition is not particularly assigned, is executed.

The user position storage unit 142 stores user position information, which is managed by the contents server 20 and in which the directionality of the interest of the user who uses the user terminal 10 is specified as distance information on a predetermined coordinate. The interest vector storage unit 143 stores information about the interest vector that indicates the directionality of the user's interest grasped from position information of the game selected by the user. The distance information storage unit 144 stores distance information that indicates the target range of the user's interest as the average of the distances between the position information of the game selected by the user and the user position information. The precision storage unit 145 stores information about a precision that indicates how many high-priority games are selected from a list of games when the user executes the automatic search. The activation frequency storage unit 146 stores information about an activation frequency that, when the user selects the default search, assigns how frequently the automatic search request is activated in the contents server 20.

In the HDD 24 of the contents server 20, the information search program 241 for running the contents information search control system according to the invention, a user position change program 242, an intentionality change program 243, and a flexibility change program 244 are stored. The HDD 24 is provided with a user information storage unit 245, a game information storage unit 246, and a game program storage unit 247.

The information search program 241 is a program that is run when the user terminal 10 requests the contents server 20 to perform the 'auto search' of the game. The user position change program 242 is a program that changes the user position information according to a predetermined condition. The intentionality change program 243 is a program that, when the directionality of the user's interest is changed, changes the search condition in reflection of the directionality. The flexibility change program 244 is a program that, when the target range of the user's interest is expanded, changes the search condition in reflection of the expanded target range.

The user information storage unit 245 stores the user position information for each user or the search condition during the automatic search. The game information storage unit 246 stores the position information for each game or the game name. The game program storage unit 247 stores a game program on which the user plays the game.

With the above-described configuration, an example of an operation to execute the automatic search and to change the search condition will be described with reference to FIGS. 8 to 14. In addition, an example of an operation to change the user position information will be described with reference to FIGS. 15 to 17.

Figure 8:
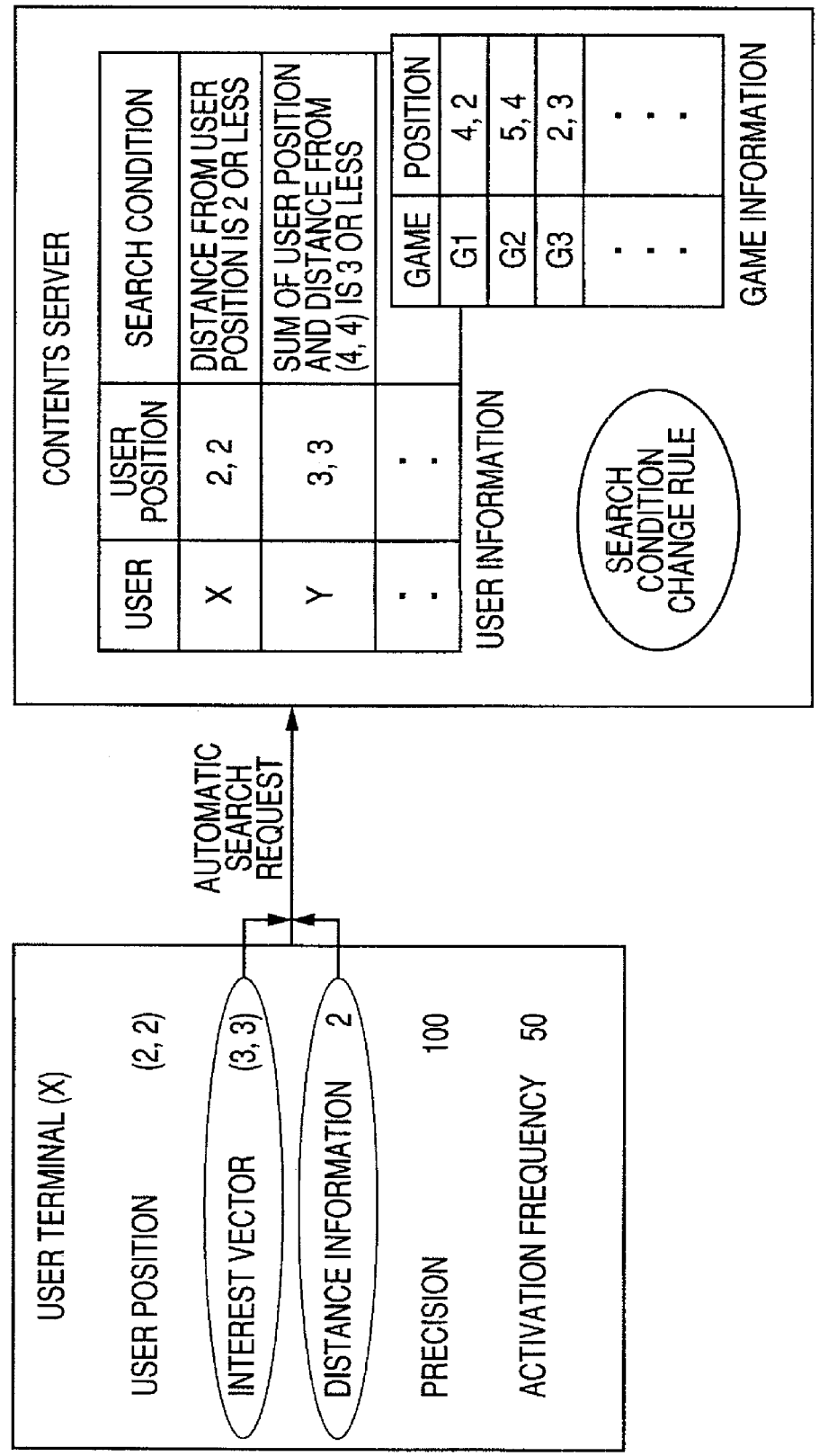
FIG. 8 is a first diagram showing an example where automatic search is performed by the contents information search control system according to the invention.

Referring to FIG. 8, in a user terminal that is operated by a user X, (2,2) based on the origin on the coordinates is stored as user position information, (3,3) that indicates a position based on a user position is stored as an interest vector, and 2, which is the average of distances from the user position and a position of a selected game, is stored as distance information. In addition, 100 (points) indicating that a high-priority game is selected by automatic search is stored as a precision, and 50 (%) indicating that the automatic search is activated once for every two times during default search is stored as an activation frequency.

In a contents server, user position information based on the origin on the coordinates for each user and a search condition when automatic search is performed are stored as user information. For the user X, (2,2) is stored as the user position information, and 'a distance from the user position is 2 or less (within the range of a circle having a radius 2 based on the user position)' is stored as the search condition. A user who is identified by user information may be identified for each user terminal based on a model number of the terminal or may be identified by a user ID input by the user, regardless of the terminal. Position information of a game based on the origin on the coordinates is stored as game information. In addition, in the program for changing the search condition, for example, the intentionality change program or the flexibility change program, the rules for changing the search condition are described.

If the user selects the default search, it is determined whether or not the automatic search is activated as the default search to automatically select a game according to the user's preference. In this example, the frequency that the automatic search is activated is determined by the activation frequency stored in the user terminal. Since the activation frequency is 50%, the automatic search request is activated in the contents server once for every two times. Then, an activation history of the automatic search is recorded in the user terminal, and the activation frequency is referred to. Accordingly, it is possible to determine whether or not the automatic search is activated. A search method not using the automatic search is not particularly limited. For example, random search that randomly extracts a game list from all the games may be used. As such, by limiting the activation frequency of the automatic search, a load on the contents server can be controlled.

The activation frequency set in the user terminal may be set to a predetermined numeric value assigned and transmitted from an administrator of the contents server. If the search condition or the user position is changed when the automatic search is executed, it is preferable to reflect the change in the directionality of the user's interest or the expansion of the target range of the interest in the activation frequency. For example, a value obtained by adding, to a usual activation frequency (o), an activation frequency (p) of individual search corresponding to an interest vector and an activation frequency (q) of individual search corresponding to distance information (where o+p+q, o+p+q≦100%) is defined as the activation frequency of the automatic search. It is assumed that, if the length of the interest vector is increased, the value p becomes high, and if the distance average is increased, the value q becomes high. Then, when the directionality of the user's interest is changed or when the target range of the interest is expanded, the frequency that the automatic search is activated is increased. For this reason, it is suitable to effectively select a game according to the user's preference.

If it is determined that the automatic search is activated, the automatic search request is transmitted from the user terminal to the contents server. Here, the latest interest vector and distance information stored in the user terminal are read out, and appended to the automatic search request. How the interest vector and distance information are calculated is as described in the example shown in FIGS. 2 to 6. Then, the arithmetic result when the latest game is selected is stored in the user terminal.

When the contents server receives the automatic search request, the intentionality change program and the flexibility change program are executed. In the intentionality change program and the flexibility change program, the rules for changing the search condition on the basis of the interest vector and the distance information are described. For example, when the interest vector exceeds a predetermined length, a rule that changes the search range to an ellipse along the interest vector based on the user position is described. Accordingly, the interest vector and the distance information appended to the automatic search request are compared with the search condition change rule. If the interest vector and the distance information correspond to the change rule, the search condition that is stored as the user information is changed.

Figure 9:
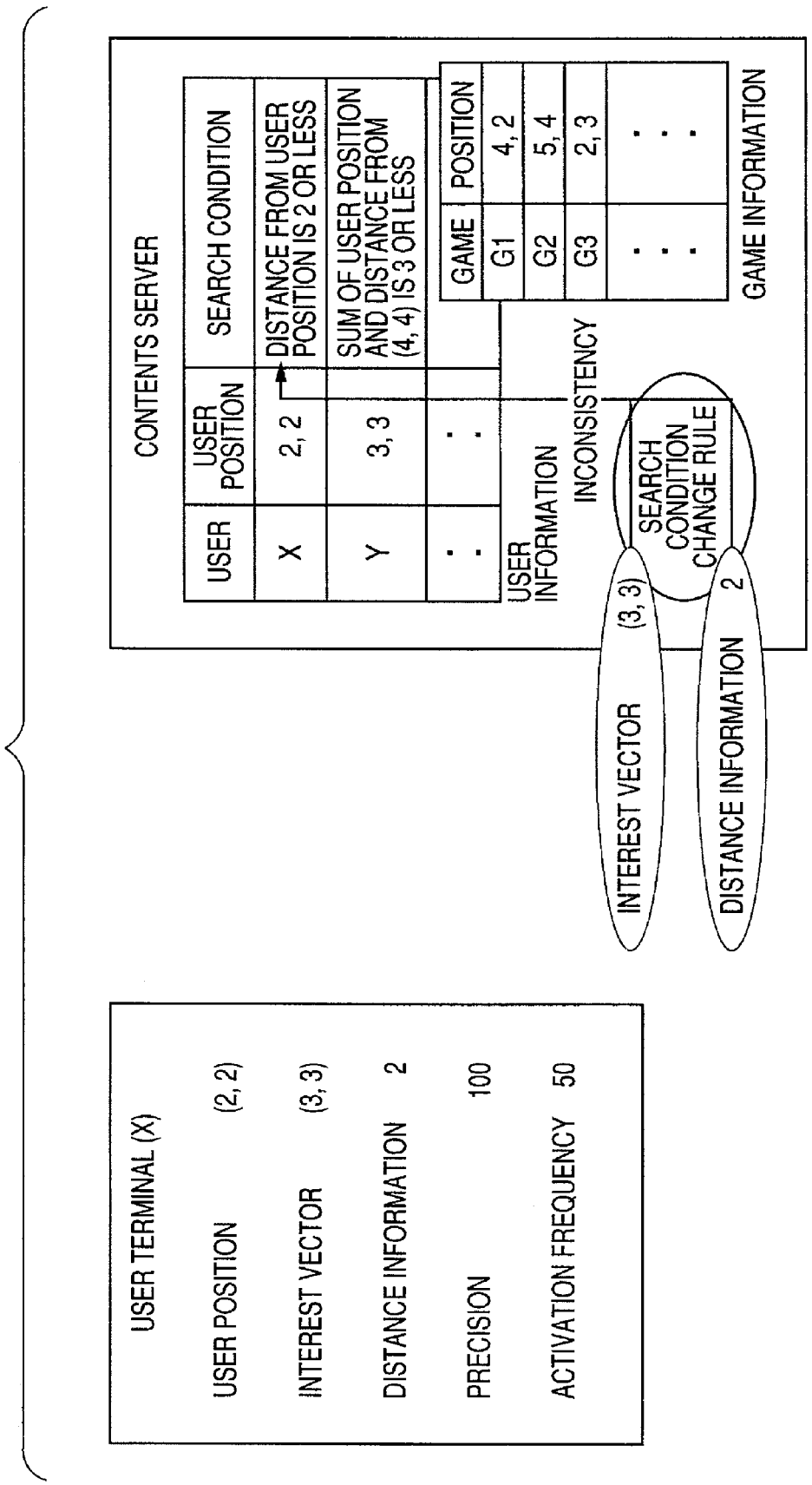
FIG. 9 is a second diagram showing an example where automatic search is performed by the contents information search control system according to the invention.
Figure 10:
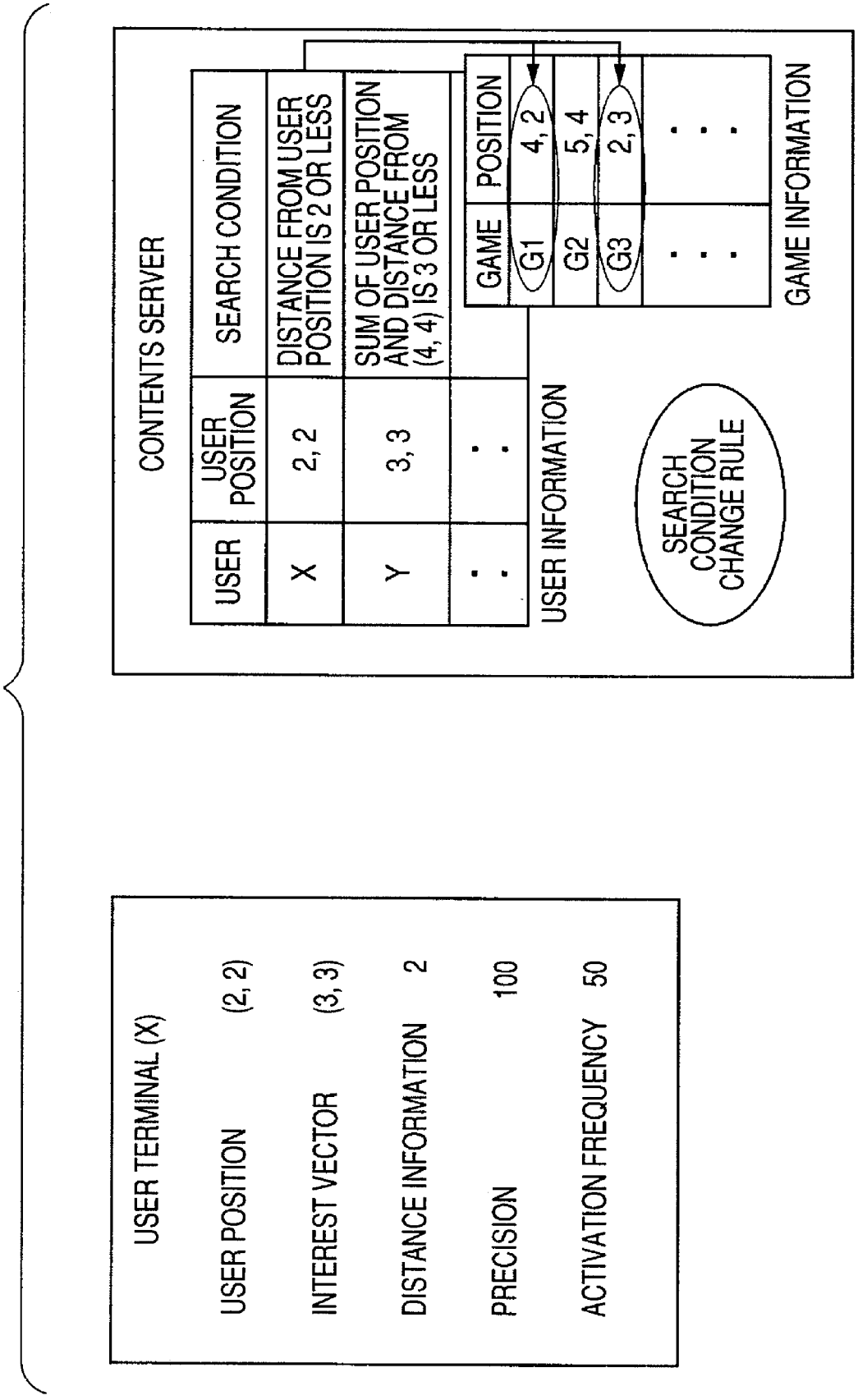
FIG. 10 is a third diagram showing an example where automatic search is performed by the contents information search control system according to the invention.
Figure 11:
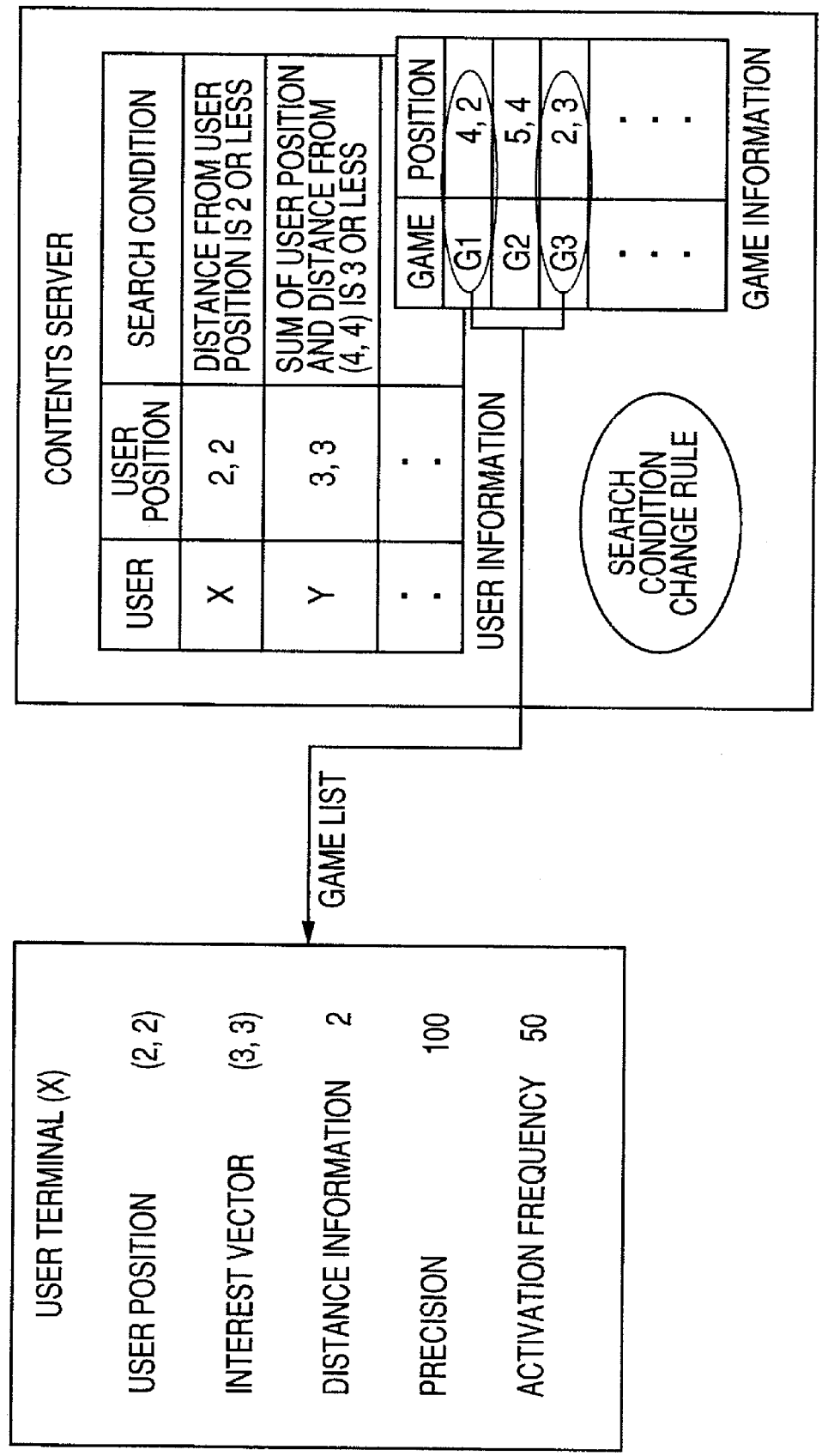
FIG. 11 is a fourth diagram showing an example where automatic search is performed by the contents information search control system according to the invention.

FIGS. 9 to 11 show an example where the interest vector and the distance information do not correspond to the search condition change rule, and thus the game list is transmitted without changing the search condition. If it is confirmed that any one of the length of the interest vector and the distance average as the distance information does not correspond to the search condition change rule (see FIG. 9), the search condition for the user X who transmits the automatic search request is read out from the user information storage unit. Then, a game that satisfies the search condition in the game information storage unit is searched.

Here, a method that specifies the user information is not particularly limited. If the user is identified for each user terminal, the model number of the terminal or an IP address may be appended to the automatic search request, and the user may be identified with the model number or the IP address as a key. In addition, if the user is identified for each user, a user ID input to the terminal by the user during login may be appended to the automatic search request, and the user may be identified with the user ID as a key. Instead of the method that appends the user ID to the automatic search request, the contents server may store the user ID after the login, and may identify that a request in the same session is a request from the user who is identified by that user ID.

In the example shown in FIG. 10, the search condition, 'the distance from the user position is 2 or less', is defined, and the user position is (2,2). Accordingly, a game that satisfies the condition is searched in the game information storage unit. Here, the games 'G1(4,2)' and 'G3(2,3)' are hit. Then, these games are transmitted to the user terminal as a popular game list for the user X (see FIG. 11). In the user terminal, as shown in FIG. 26, the popular game list is displayed on a display.

In regards to the games in the game list to be transmitted, it is determined according to the distance from the user position that a game within a short distance fits the user's preference, and a priority may be set to each game. In regards to the game selected by the user from the game list, points according to the priority are added and stored as the precision (100 points in the example shown in FIGS. 8 to 14). Therefore, it is possible to grasp how much the automatic search result fits the user's preference.

Figure 12:
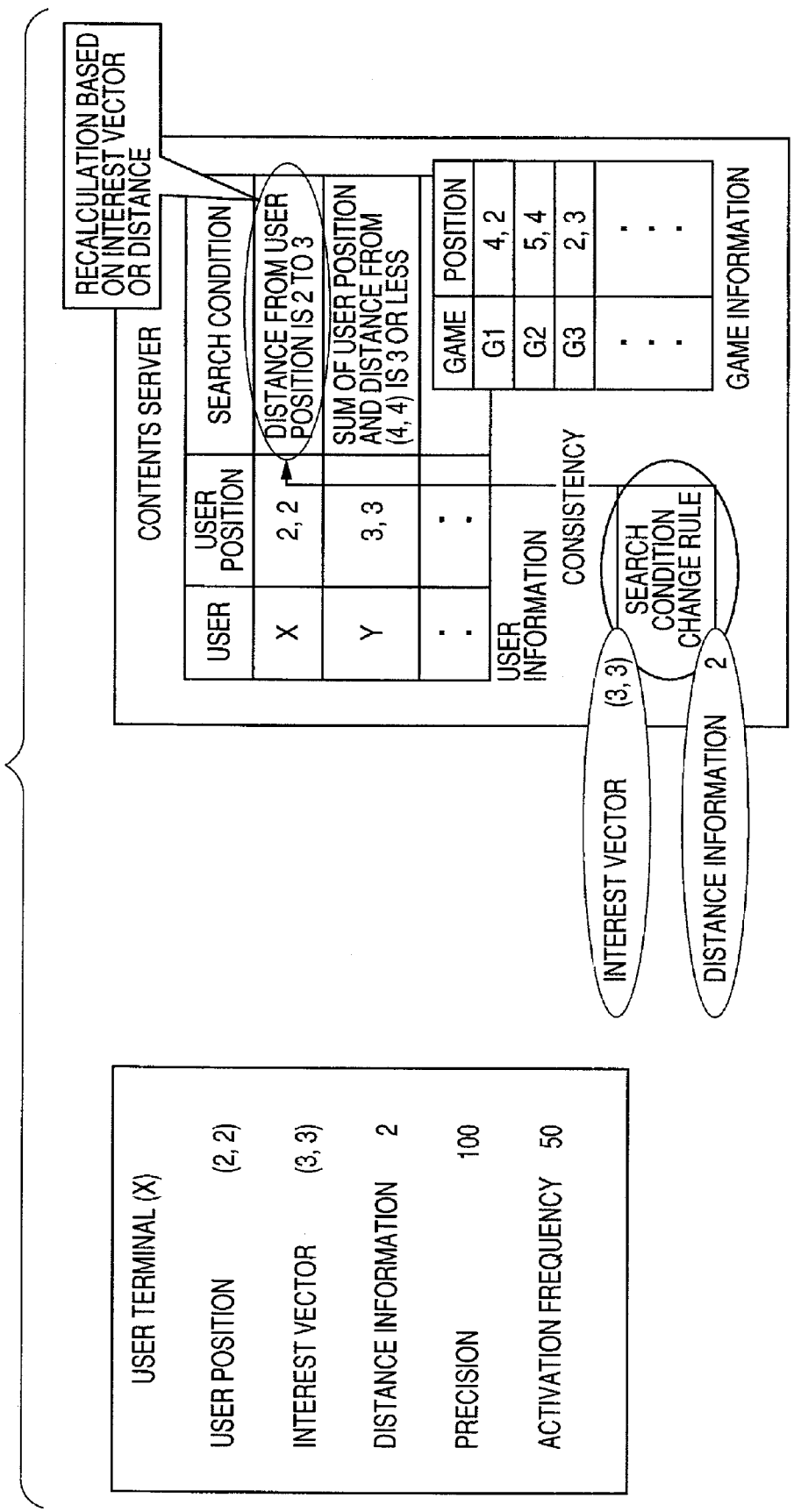
FIG. 12 is a fifth diagram showing an example where automatic search is performed by the contents information search control system according to the invention.
Figure 14:
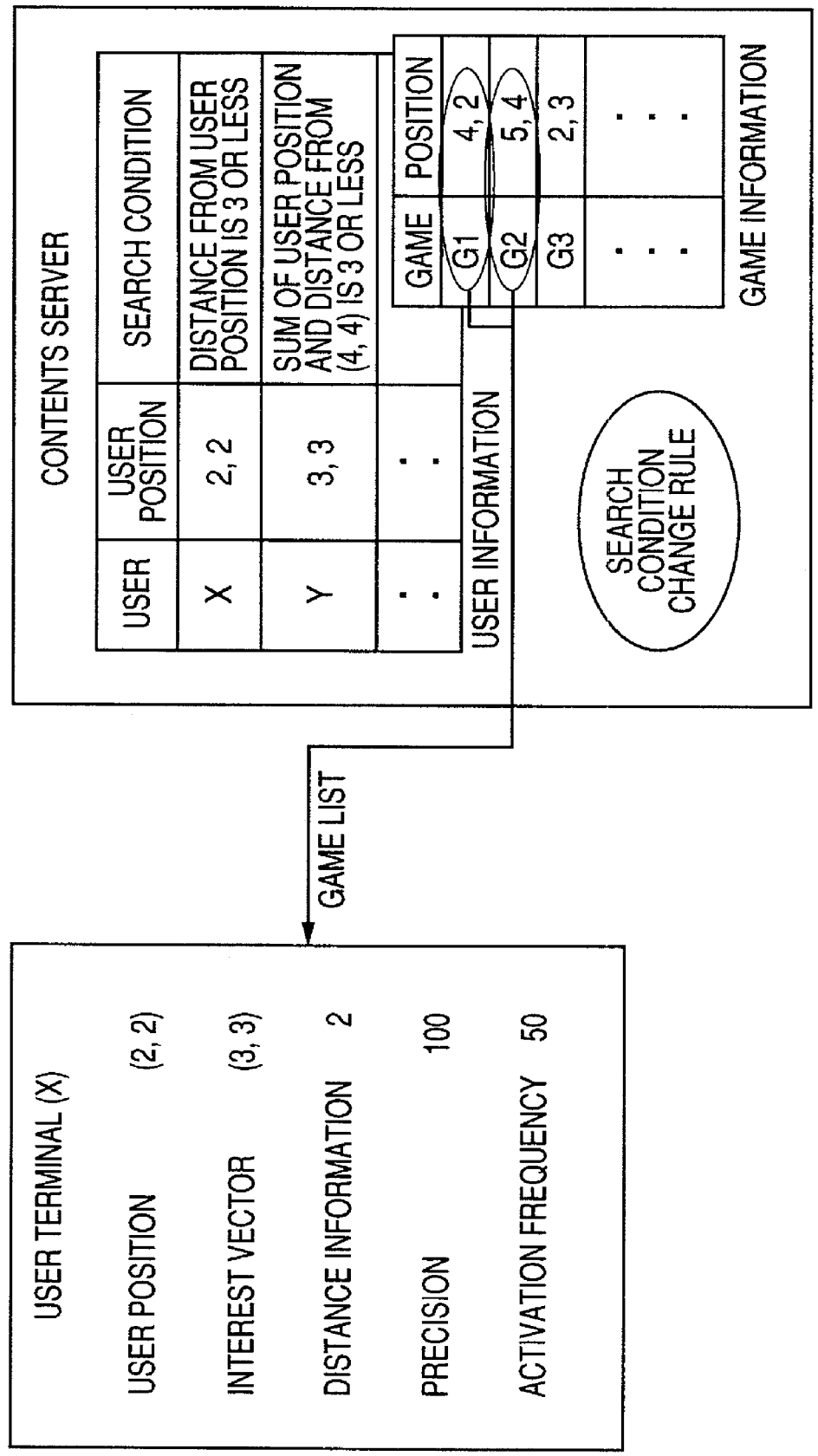
FIG. 14 is a seventh diagram showing an example where automatic search is performed by the contents information search control system according to the invention.

FIGS. 12 to 14 show an example where the interest vector and the distance information correspond to the search condition change rule, and thus the game list is transmitted while the search condition is changed. If it is confirmed that the length of the interest vector or the distance average as the distance information correspond to the search condition change rule, the search condition for the user X who transmits the automatic search request is reads out from the user information storage unit, and then the search condition is changed according to a predetermined condition. (see FIG. 12). Subsequently, a game that satisfies the changed search condition is searched in the game information storage unit.

In the example shown in FIG. 13, the search condition, 'the distance from the user position is within a range of 2 to 3', is defined, and the user position is (2,2). Accordingly, a game that satisfies the condition is searched in the game information storage unit. Here, the games 'G1(4,2)' and 'G2(5,4)' are hit. Then, these games are transmitted to the user terminal as the popular game list for the user X (see FIG. 14). In the user terminal, as shown in FIG. 26, the popular game list is displayed on the display.

FIGS. 15 to 17 show an example where the user position information is changed when it is determined that a popular game list displayed by the automatic search does not fit the user's preference. In the user terminal, as described above, the precision calculated from the priority of the game, which is selected by the user from the popular game list displayed by the automatic search is stored. Then, when it is detected that a predetermined condition is satisfied, for example, that the precision is less than a threshold value, a request to change the user position is transmitted to the contents server. The change request is appended with the interest vector read out from the interest vector storage unit (see FIG. 15).

The precision used herein can be calculated as follows, for example. According to whether the user touches a game having an arbitrary priority from the game list displayed by the automatic search (only game information is displayed while game software is not called and played) or selects the game (game software is called and played), the number of points is calculated as follows and updated as the precision each time the automatic search is performed.

<Search Result Touch Point=A>
  Game having first priority is selected . . . 100 points
  Game having n-th priority is selected . . . 100−(n×10) points
  Search result is not touched . . . −100 points
<Search Result Details Access Point=B>
  Game having first priority is selected . . . 100 points
  Game having n-th priority is selected . . . 100−(n×10) points
  Lowest priority is selected . . . 10 points
  Precision=(A×y+B×z)/Number of automatic searches
  (where n is a natural number, and y and Z are predetermined coefficients)

In the request to change the user position transmitted from the user terminal, in addition to the interest vector (3,3), the user ID for identifying the user is included. As described above, the user identification may be performed for each terminal or for each user. If the contents server receives the request to change the user position, the user position information of the corresponding user is read out from the user information stored in the contents server. In the example shown in FIG. 16, recalculation is performed on the read user position (2,2) in reflection of the interest vector (3,3) on the basis of a predetermined condition, and the user position is updated to a user position (4,4), in which a user's recent intention is reflected.

In the contents server, if the user position information is updated, the updated user position information is notified to the user terminal (see FIG. 17). In the user terminal that receives the notification, the user position information stored in the user position storage unit is updated to (4,4), which is the same user position information as the contents server. Moreover, the user position information is not necessarily stored in both the user terminal and the contents server. For example, the user position information may be stored in one of the user terminal and the contents server and may be transmitted to the other. However, in view of the management of the user information and the process efficiency, the user position information is preferably stored in both the user terminal and the contents server.

A timing at which the user position information is updated is not limited to a timing that is determined by the precision, as described in the example of FIGS. 15 to 17. For example, the user position information may be changed when the contents server receives the automatic search request and performs the automatic search, and when, as the comparison result of the length of the interest vector or the distance information under a predetermined condition, it is determined that the user's interest is changed.

In the examples described with reference to FIGS. 8 to 17, as described above, the interest vector indicating the directionality of the user's interest or the distance information, in which the target range of the user's interest is reflected is calculated by the user terminal and stored in the user terminal. Alternatively, the interest vector or the distance information may be calculated by the contents server, and may be then stored in the contents server as part of the user information. Since information about a game selected by the user or game software played by the user is transmitted from the contents server, in the contents server, it is possible to grasp which game the user selects.

A process flow when automatic search is performed by the contents information search control system according to the invention will now be described with reference to flowcharts of FIGS. 18 to 22.

Figure 18:
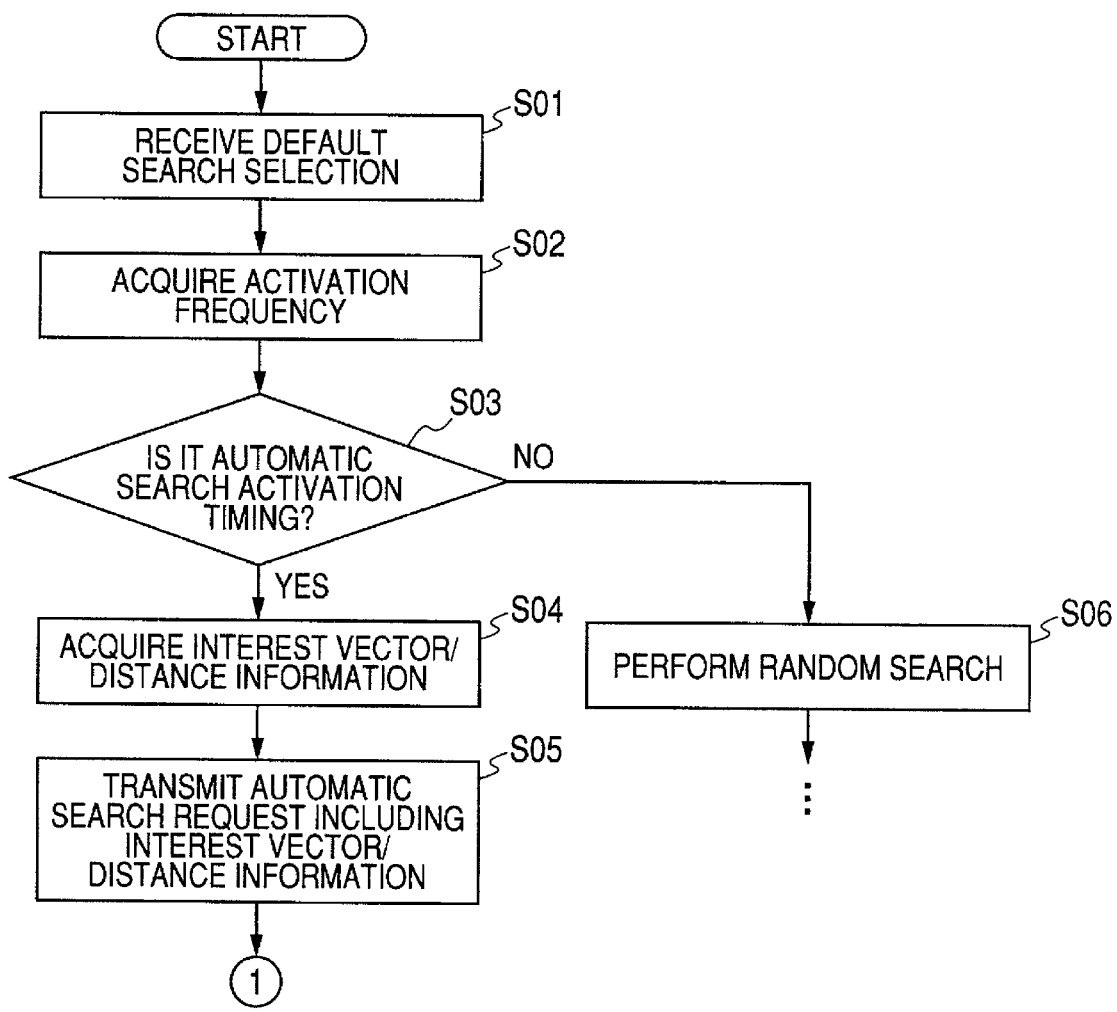
FIG. 18 is a first flowchart showing a process flow when automatic search is performed by the contents information search control system according to the invention.

FIG. 18 shows a flowchart of a process flow when a user terminal receives default search selection and transmits an automatic search request. In the user terminal that accesses the contents server, if the selection of a menu default search is received (Step S01), the activation frequency of the automatic search stored in the user terminal is read out (Step S02). In reference to the read activation frequency and a default search execution history, it is determined whether or not this default search is at a timing at which the automatic search is activated (Step S03).

If it is determined that it is not the automatic search activation timing, a different kind of search, such as random search, is performed (Step S06), and the search result is displayed on the display of the user terminal. If it is determined that it is the automatic search activation timing, the interest vector and the distance information stored in the user terminal are read out (Step S04), and the automatic search request including the interest vector and the distance information is transmitted to the contents server (Step S05).

Figure 19:
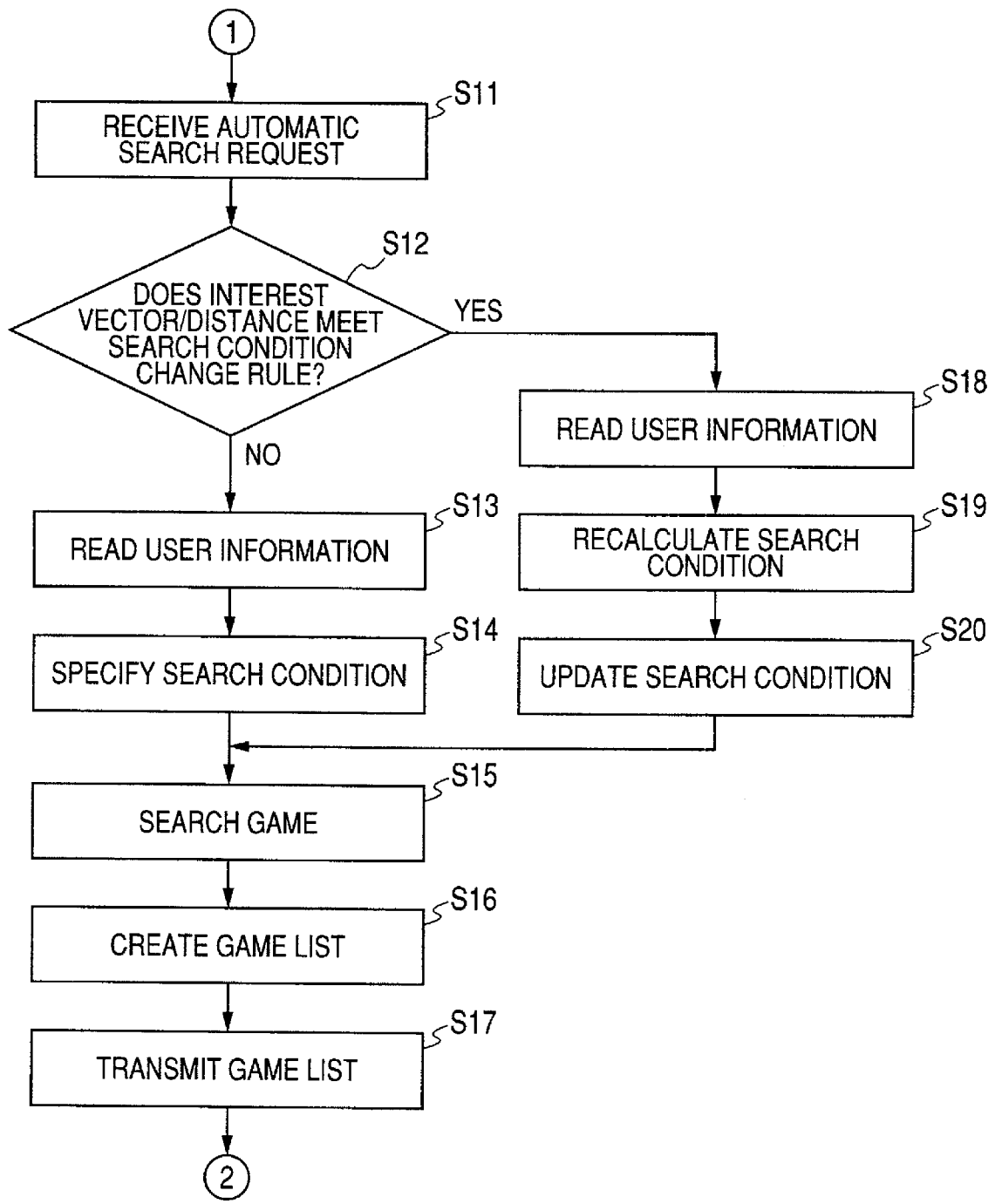
FIG. 19 is a second flowchart showing a process flow when automatic search is performed by the contents information search control system according to the invention.

FIG. 19 shows a process flow in a case where a contents server receives an automatic search request and transmits a popular game list to a user terminal. When the automatic search request is received from the user terminal (step S11), it is determined whether or not the interest vector and the distance information appended to the automatic search request fit the change rule for changing the search condition (Step S12). If the interest vector and the distance information do not fit the change rule, the user information corresponding to the user who transmits the automatic search request is read out (Step S13), and the search condition stored as the user information is specified (Step S14). If the interest vector and the distance information fit the change rule, the user information corresponding to the user who transmits the automatic search request is read out (Step S18), the search condition stored as the user information is recalculated (Step S19), and the search condition is updated according to the recalculation result (Step S20).

Subsequently, a game is searched on the basis of the specified search condition or the updated search condition (Step S15). A game list is created from games hit by the search (Step S16), and the created game list is transmitted to the user terminal (Step S17). In the game list, in addition to the title of each game, the position information of the game is included.

FIG. 20 shows a process flow when, in a user terminal, a game list is received and a game is selected. When the game list is received from the contents server (Step S21), the received game list is displayed on the display as the search result (Step S22). When a game is selected from the list (Step S23), the interest vector is recalculated from the position information of the selected game (Step S24). Then, it is confirmed whether or not the recalculated interest vector exceeds a predetermined length (Step S25). If the interest vector exceeds the predetermined length, the activation frequency that the automatic search is activated is updated in reflection of the interest vector (Step S26). The recalculated interest vector is stored in the user terminal (Step S27).

Next, the distance information that is the average of the distances between the user position and the game position is recalculated from the position information of the selected game (Step S28). It is confirmed whether or not the recalculated distance information exceeds a predetermined distance (Step S29). When the distance information exceeds the predetermined distance, the activation frequency that the automatic search is activated is updated in reflection of the distance information (Step S30). The recalculated distance information is stored in the user terminal (Step S31). At the same time the recalculation is performed, a request to transmit the selected game is transmitted to the contents server (Step S32).

The flowchart of FIG. 20 corresponds to a flow in which the user immediately selects a game to play from a game list. Meanwhile, before the user selects the game to play from the game list, a step of displaying detailed information of each game when the user touches a game in the game list may be provided. The detailed information of the game to be displayed may be included as part of the game list that is transmitted from the contents server, or in each case, a request to transmit detailed information may be transmitted to the contents server.

FIG. 21 shows a process flow when, in a contents server, a request to transmit a game is received and game software is transmitted to a user terminal. When the request to transmit a game is received from the user terminal (Step S41), a game program stored in the contents server is read out (Step S42), and the read game program is transmitted to the user terminal (Step S43).

FIG. 22 shows a process flow when, in a user terminal, a game program is received and a game is played. When the game program is received from the contents server (Step S51), the received game program is run (Step S52). Then, the user plays the game according to the running game program. At this time, the game program may be run only on the user terminal, or may be executed in communication with the contents server.

A process flow when user position information is updated by the contents information search control system according to the invention will now be described with reference to flowcharts of FIGS. 23 to 25.

FIG. 23 shows a process flow when, in a user terminal, a game is selected and a request to update user position information is transmitted. If a game is selected from the game list displayed by the above-described automatic search (Step S23), the precision stored in the user terminal is recalculated from the position information of the selected game and the user position information (Step S61).

It is confirmed whether or not the recalculated precision is less than a predetermined threshold value (Step S62). If the precision is not less than the threshold value, it is determined that it is not necessary to change the user position. If the precision is less than the threshold value, the interest vector stored in the user terminal is read out (Step S63), and a request to update user position information including the interest vector is transmitted to the contents server (Step S64).

FIG. 24 shows a process flow when the contents server receives an update request of user position information, and updates the user position information. When the update request of the user position information is received from the user terminal (Step S71), the contents server acquires user position information by reading out user information corresponding to a user who transmits the update request (Step S72). In reflection of an interest vector appended to the update request, recalculation is preformed on the acquired user position information (Step S73), and the user position information is updated according to the recalculation result (Step S74). The updated user position information is transmitted to the user terminal (Step S75).

FIG. 25 shows a process flow when the user terminal receives the user position information. When the updated user position information is received from the contents server (Step S81), the user position information stored in the user terminal is updated to the received user position information (Step S82).

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

What is claimed is:

1. A contents information search control system that is provided in a contents server to allow the contents server to automatically search contents when receiving a search request from a user terminal and display the searched contents on the user terminal, the contents information search control system comprising:
   a user information storage that, using at least two coordinate axes based on a component for specifying a user interest of a user of the user terminal, stores user position information for assigning a user intention as position information based on the coordinate axes, and a search condition when the search request is received from the user assigned by the position information based on the coordinate axes;
   a contents position information storage that, for contents to be transmitted from the contents server to the user terminal, stores contents position information, in which an attribute of contents assigned by the position information based on the coordinate axes is reflected;
   a contents searcher that, when the search request is received from the user terminal, reads out user position information of the user, and the search condition corresponding to the user from the user information storage, searches contents, which satisfies the search condition, from the contents position information storage by applying the user position information to the search condition, and transmits information about at least part of the contents specified by the search to the user terminal; and a search condition updater acquires an interest vector, which is generated from the contents positions information of the contents previously selected by the user, and assigns the user interest as vector information on the coordinate axes, and when the interest vector satisfies the predetermined condition, updates the search condition corresponding to the user stored in the user information storage in reflection of a calculation result of the interest vector which is calculated from contents position information of contents previously selected by the user, when the calculation result satisfies a predetermined condition.

2. The contents information search control system according to claim 1, further comprising:

a user position information transmitter that transmits user position information of the user to the user terminal; and a contents position information transmitter that transmits, to the user terminal, the contents position information of the contents previously selected by the user to generate an interest vector, which assigns the user interest as vector information on the coordinate axes, by adding the contents position information previously selected by the user, wherein the contents searcher, when the search request is appended with the user position information stored in the user terminal and the interest vector generated in the user terminal, reads out the search condition corresponding to the user from the user, information storage, and the search condition updater, when the interest vector satisfies the predetermined condition, updates the search condition in reflection of the interest vector.

3. The contents information search control system according to claim 1, wherein the user information storage assigns, as the search condition of the user, a search range that is within a predetermined distance from a point to be specified by the user position information of the user, and the search condition updater updates the search condition such that the sum of a distance from the point to be specified by the user position information and a distance from a point to be specified by position information of a position on the interest vector is within a predetermined value.

4. The contents information search control system according to claim 1, further comprising:

a position information updater that, when the interest vector satisfies a predetermined condition, updates the position information corresponding to the user stored in the user information storage in reflection of the interest vector.

5. The contents information search control system according to claim 1, wherein the contents searcher, when the search request is received from the user terminal, reads out user position information of the user and the search condition corresponding to the user from the user information storage, and the search condition updater acquires distance information, which is calculated from a distance between the user position information and the contents position information of the contents previously selected by the user, and assigns a difference between the user intention to be specified by the user position information and the contents previously selected by the user as a distance on the coordinate axes, and, when the distance information satisfies the predetermined condition, updates the search condition in reflection of the distance information.

6. The contents information search control system according to claim 5, wherein the user information storage assigns, as the search condition of the user, a search range that is within a predetermined distance from a point to be specified by the user position information of the user, and the search condition updater updates the search condition such that a search range is out of a predetermined distance from the point to be specified by the user position information and within a predetermined distance of a point to be specified by the distance information.

7. The contents information search control system according to claim 1, further comprising:

a user position information transmitter that transmits user position information of the user to the user terminal; and a contents position information transmitter that transmits, to the user terminal, the contents position information of the contents previously selected by the user to calculate distance information, which assigns a difference between the user intention to be specified by the user position information and the contents previously selected by the user as a distance on the coordinate axes, from a distance between the user position information in the user terminal and the contents position information of the contents previously selected by the user, wherein the contents searcher, when the search request is appended with the user position information stored in the user terminal and the distance information calculated in the user terminal, reads out the search condition corresponding to the user from the user information storage, and the search condition updater, when the distance information satisfies the predetermined condition, updates the search condition in reflection of the distance information.

8. The contents information search control system according to claim 1, wherein the contents searcher, when the search request is received from the user terminal, reads out user position information of the user and the search condition corresponding to the user from the user information storage, a first search condition updater acquires an interest vector, which is generated from the contents position information of the contents previously selected by the user and assigns the user interest as vector information on the coordinate axes, and, when the interest vector satisfies the predetermined condition, updates the search condition in reflection of the interest vector, and a second search condition updater acquires distance information, which is calculated from a distance between the user position information and the contents position information of the contents previously selected by the user, and assigns a difference between the user intention and the contents previously selected by the user as a distance on the coordinate axes, and, when the distance information satisfies the predetermined condition, updates the search condition in reflection of the interest vector.

9. The contents information search control system according to claim 8, wherein the user information storage assigns, as the search condition of the user, a search range that is within a predetermined distance from a point to be specified by the user position information of the user, the first search condition updater updates the search condition such that a sum of a distance from the point to be specified by the user position information and a distance from a point to be specified by position information of a position on the interest vector is within a predetermined value, and the second search condition updater updates the search condition such that a search range is out of a predetermined distance from the point to be specified by the user position information and within a predetermined distance of a point to be specified by the distance information.

10. The contents information search control system according to claim 8, further comprising:

a position information updater that, when the interest vector and the distance information satisfy the predetermined condition, updates the search condition in reflection of the interest vector and the distance information.

11. The contents information search control system according to claim 1, further comprising:

a user position information transmitter that transmits user position information of the user, to the user terminal; and a contents position information transmitter that transmits, to the user terminal, the contents position information of the contents previously selected by the user to generate an interest vector, which assigns the user interest as vector information on the coordinate axes, by adding contents position information of the contents previously selected by the user, and to calculate distance information, which assigns a difference between the user interest to be specified by the user position information and the contents previously selected by the user as a distance on the coordinate axes, from a distance between the user position information in the user terminal and the contents position information of the contents previously selected by the user, wherein the contents searcher, when the search request is appended with the user position information stored in the user terminal and the interest vector generated in the user terminal and the distance information calculated in the user terminal, reads out the search condition corresponding to the user from the user information storage, a first search condition updater, when the interest vector satisfies the predetermined condition, updates the search condition in reflection of the interest vector; and a second search condition updater, when the distance information satisfies the predetermined condition, updates the search condition in reflection of the interest vector.

* * * * *

UNITED STATES PATENT AND TRADEMARK OFFICE
CERTIFICATE OF CORRECTION

| | | |
|---|---|---|
| PATENT NO. | : 7,899,814 B2 | |
| APPLICATION NO. | : 12/056886 | |
| DATED | : March 1, 2011 | |
| INVENTOR(S) | : T. Tanaka et al. | |

It is certified that error appears in the above-identified patent and that said Letters Patent is hereby corrected as shown below:

At column 25, line 33 (claim 2, line 16) of the printed patent, change "to the user from the user, information storage," to --to the user from the user information storage,--.

At column 27, line 24 (claim 11, line 4) of the printed patent, change "information of the user, to the user terminal;" to --information of the user to the user terminal;--.

Signed and Sealed this
Fourteenth Day of June, 2011

David J. Kappos
*Director of the United States Patent and Trademark Office*